(12) United States Patent
Zhou et al.

(10) Patent No.: US 12,081,476 B2
(45) Date of Patent: *Sep. 3, 2024

(54) UPLINK REFERENCE SIGNAL SPATIAL RELATION IDENTIFICATION TECHNIQUES

(71) Applicant: QUALCOMM Incorporated, San Diego, CA (US)

(72) Inventors: Yan Zhou, San Diego, CA (US); Tao Luo, San Diego, CA (US); Kiran Venugopal, Green Brook, NJ (US); Jung Ho Ryu, Fort Lee, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/893,483

(22) Filed: Aug. 23, 2022

(65) Prior Publication Data

US 2023/0074467 A1   Mar. 9, 2023

Related U.S. Application Data

(63) Continuation of application No. 16/810,676, filed on Mar. 5, 2020, now Pat. No. 11,424,880.

(Continued)

(51) Int. Cl.
*H04W 72/04*   (2023.01)
*H04L 5/00*    (2006.01)
(Continued)

(52) U.S. Cl.
CPC .......... *H04L 5/0048* (2013.01); *H04W 76/10* (2018.02)

(58) Field of Classification Search
CPC ..... H04L 5/0048; H04L 5/001; H04L 5/0023; H04L 5/0091; H04L 5/0051; H04W 76/10
(Continued)

(56) References Cited

U.S. PATENT DOCUMENTS 10,367,616 B2   7/2019  Islam et al.
11,424,880 B2 *  8/2022  Zhou ................. H04L 5/0091
(Continued)

FOREIGN PATENT DOCUMENTS

KR   20180122919 A   11/2018
TW     201907680 A    2/2019
(Continued)

OTHER PUBLICATIONS

CATT: "Enhancements on Multi-Beam Operation", 3GPP TSG RAN WG1 Meeting #95, R1-1812636, Spokane, USA, Nov. 12-16, 2018, 9 Pages.
(Continued)

*Primary Examiner* — Maharishi V Khirodhar
(74) *Attorney, Agent, or Firm* — Holland & Hart LLP

(57) ABSTRACT

Methods, systems, and devices for wireless communications are described in which spatial relations for one or more uplink reference signal transmissions, such as sounding reference signal (SRS) transmissions, may be configured and a particular spatial relation indicated in a medium access control (MAC) control element (CE). A base station may configure a pool of available spatial relations for use in SRS transmissions, and the MAC-CE may indicate which spatial relation of the set of available spatial relations is to be used. In other cases, the MAC-CE may provide all of the spatial relation information for an associated SRS transmission. The UE, responsive to receiving the MAC-CE, may transmit a SRS to the base station using the indicated spatial relation.

30 Claims, 16 Drawing Sheets

Related U.S. Application Data

(60) Provisional application No. 62/816,023, filed on Mar. 8, 2019.

(51) Int. Cl.
*H04W 76/00* (2018.01)
*H04W 76/10* (2018.01)
*H04W 88/08* (2009.01)

(58) Field of Classification Search
USPC .......................................... 370/329
See application file for complete search history.

(56) References Cited

U.S. PATENT DOCUMENTS

2018/0287757 A1  10/2018  Onggosanusi
2019/0280835 A1   9/2019  Maattanen et al.

FOREIGN PATENT DOCUMENTS

| WO | WO-2017176406 A1 | 10/2017 |
| WO | WO-2018174641 A2 | 9/2018 |
| WO | WO-2018199696 A1 | 11/2018 |
| WO | 2018232090 A1 | 12/2018 |

OTHER PUBLICATIONS

Intel Corporation: "On Beam Management Enhancement", 3GPP TSG RAN WG1 Meeting #96, 3GPP Draft, R1-1902503, 3rd Generation Partnership Project (3GPP), Mobile Competence Centre, 650, Route Des Lucioles, F-06921 Sophia-Antipolis Cedex, France, Athens, Greece, Feb. 25, 2019-Mar. 1, 2019, pp. 1-13, Mar. 1, 2019 (Mar. 1, 2019), XP051600199, Chapter 5 & 6, https://www.3gpp.org/ftp/tsg_ran/WG1_RL1/TSGR1_96/Docs/R1-1902503.zip.

International Preliminary Report on Patentability - PCT/US2020/021432 the International Bureau of WIPO—Geneva, Switzerland, Sep. 23, 2021.

International Search Report and Written Opinion—PCT/US2020/021432—ISA/EPO—Jun. 19, 2020.

Nokia, et al., "Enhancements on Multi-Beam Operation", 3GPP TSG RAN WG1 Meeting #96, R1-1902564, Athens, Greece, Feb. 25-Mar. 1, 2019, 22 Pages, https://www.3gpp.org/ftp/tsg_ran/WG1_RL1/TSGR1_96/Docs/R1-1902564.zip.

Ericsson: "On Beam Indication, Measurement, and Reporting", 3GPP TSG-RAN WG1 NR Ad Hoc #3, R1-1716350, Nagoya, Japan, Sep. 18, 2017-Sep. 21, 2017, pp. 1-13.

* cited by examiner

UPLINK REFERENCE SIGNAL SPATIAL RELATION IDENTIFICATION TECHNIQUES

CROSS REFERENCE

The present Application for Patent is a Continuation of U.S. patent application Ser. No. 16/810,676 by ZHOU et al., entitled "UPLINK REFERENCE SIGNAL SPATIAL RELATION INDENTIFICATION TECHNIQUES" filed Mar. 5, 2020, which claims the benefit of U.S. Provisional patent application Ser. No. 62/816,023 by ZHOU et al., entitled "UPLINK REFERENCE SIGNAL SPATIAL RELATION IDENTIFICATION TECHNIQUES," filed Mar. 8, 2019, assigned to the assignee hereof, and expressly incorporated herein.

INTRODUCTION

The following relates to wireless communications, and more specifically to managing uplink reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may use various configurations to support wireless transmissions and receptions. For example, the configurations may be used to select or otherwise identify various parameters to be used for the wireless communications. Examples of the parameters may include, but are not limited to, the transmit power for the transmissions, modulation and coding schemes (MCS), rate matching information, and the like. In some systems, configuration parameters may further include spatial relation information, e.g., beam direction, beam identifier, spatial stream, and the like. Generally, the configuration parameters may be updated as needed, periodically, etc. In some cases, one or more parameters may need to be updated in a periodic or non-periodic manner. In cases where one or more parameters are to be updated, efficient initiation and performance of one or more procedures to update the parameters may help enhance system efficiency.

SUMMARY

A method of wireless communication at a UE is described. The method may include determining a set of available spatial relations for transmitting a sounding reference signal to a base station, each spatial relation of the set of available spatial relations indicating one or more uplink transmission parameters for transmission of a sounding reference signal, receiving, from the base station, a medium-access-control control element that indicates a sounding reference signal is to be transmitted to the base station and a first spatial relation of the set of available spatial relations to be used for the sounding reference signal, and transmitting the sounding reference signal to the base station using the one or more uplink transmission parameters indicated in the first spatial relation.

An apparatus for wireless communication at a UE is described. The apparatus may include a processor, memory coupled to the processor, and the processor and memory configured to: determine a set of available spatial relations for transmitting a sounding reference signal to a base station, each spatial relation of the set of available spatial relations indicating one or more uplink transmission parameters for transmission of a sounding reference signal, receive, from the base station, a medium-access-control control element that indicates a sounding reference signal is to be transmitted to the base station and a first spatial relation of the set of available spatial relations to be used for the sounding reference signal, and transmit the sounding reference signal to the base station using the one or more uplink transmission parameters indicated in the first spatial relation.

Another apparatus for wireless communication at a UE is described. The apparatus may include means for determining a set of available spatial relations for transmitting a sounding reference signal to a base station, each spatial relation of the set of available spatial relations indicating one or more uplink transmission parameters for transmission of a sounding reference signal, receiving, from the base station, a medium-access-control control element that indicates a sounding reference signal is to be transmitted to the base station and a first spatial relation of the set of available spatial relations to be used for the sounding reference signal, and transmitting the sounding reference signal to the base station using the one or more uplink transmission parameters indicated in the first spatial relation.

A non-transitory computer-readable medium storing code for wireless communication at a UE is described. The code may include instructions executable by a processor to determine a set of available spatial relations for transmitting a sounding reference signal to a base station, each spatial relation of the set of available spatial relations indicating one or more uplink transmission parameters for transmission of a sounding reference signal, receive, from the base station, a medium-access-control control element that indicates a sounding reference signal is to be transmitted to the base station and a first spatial relation of the set of available spatial relations to be used for the sounding reference signal, and transmit the sounding reference signal to the base station using the one or more uplink transmission parameters indicated in the first spatial relation.

In some examples of the method, apparatuses, and non-transitory computer-readable medium described herein, the sounding reference signal includes an aperiodic, periodic, and semi-persistent sounding reference signal.

In some examples of the method, apparatuses, and non-transitory computer-readable medium described herein, the sounding reference signal may be transmitted for one or more of a beam management procedure, codebook or non-codebook precoding procedure, antenna switching procedure, or any combinations thereof.

In some examples of the method, apparatuses, and non-transitory computer-readable medium described herein, determining the set of available spatial relations may include operations, features, means, or instructions for receiving spatial relation information for physical uplink control channel communications that indicates the set of available spatial relations for transmitting the physical uplink control channel, each available spatial relation of the set of available spatial relations having a corresponding physical uplink control channel spatial relation information identification.

In some examples of the method, apparatuses, and non-transitory computer-readable medium described herein, the medium-access-control control element indicates a physical uplink control channel spatial relation information identification associated with the first spatial relation may be to be used for the sounding reference signal.

In some examples of the method, apparatuses, and non-transitory computer-readable medium described herein, the spatial relation information for the physical uplink control channel may be received in radio resource control signaling.

In some examples of the method, apparatuses, and non-transitory computer-readable medium described herein, the determining the set of available spatial relations may include operations, features, means, or instructions for receiving spatial relation information that indicates the set of available spatial relations for sounding reference signal transmissions, each available spatial relation of the set of available spatial relations having a corresponding sounding reference signal spatial relation information identification.

In some examples of the method, apparatuses, and non-transitory computer-readable medium described herein, the medium-access-control control element indicates a sounding reference signal spatial relation information identification associated with the first spatial relation may be to be used for the sounding reference signal.

In some examples of the method, apparatuses, and non-transitory computer-readable medium described herein, the spatial relation information for sounding reference signal transmissions may be received in radio resource control signaling.

In some examples of the method, apparatuses, and non-transitory computer-readable medium described herein, the set of available spatial relations may be determined for each bandwidth part or component carrier that may be available for transmission of a sounding reference signal.

In some examples of the method, apparatuses, and non-transitory computer-readable medium described herein, the set of available spatial relations may be determined for one or more sounding reference signal resources that may be available for sounding reference signal transmissions.

In some examples of the method, apparatuses, and non-transitory computer-readable medium described herein, each spatial relation of the set of available spatial relations indicates a serving cell index, a sounding reference signal bandwidth part index, a synchronization signal block index, a channel state information reference signal index, a sounding reference signal resource index, or any combinations thereof.

A method of wireless communication at a UE is described. The method may include establishing a connection with a base station via one or more transmission beams, receiving, from the base station, a medium-access-control control element that indicates a sounding reference signal is to be transmitted to the base station and spatial relation information for the transmission of the sounding reference signal, where the spatial relation information indicates one or more uplink transmission parameters for transmission of the sounding reference signal via the one or more transmission beams, and transmitting the sounding reference signal to the base station using the one or more uplink transmission parameters indicated in the medium-access-control control element.

An apparatus for wireless communication at a UE is described. The apparatus may include a processor, memory coupled to the processor, and the processor and memory configured to: establish a connection with a base station via one or more transmission beams, receive, from the base station, a medium-access-control control element that indicates a sounding reference signal is to be transmitted to the base station and spatial relation information for the transmission of the sounding reference signal, where the spatial relation information indicates one or more uplink transmission parameters for transmission of the sounding reference signal via the one or more transmission beams, and transmit the sounding reference signal to the base station using the one or more uplink transmission parameters indicated in the medium-access-control control element.

Another apparatus for wireless communication at a UE is described. The apparatus may include means for establishing a connection with a base station via one or more transmission beams, receiving, from the base station, a medium-access-control control element that indicates a sounding reference signal is to be transmitted to the base station and spatial relation information for the transmission of the sounding reference signal, where the spatial relation information indicates one or more uplink transmission parameters for transmission of the sounding reference signal via the one or more transmission beams, and transmitting the sounding reference signal to the base station using the one or more uplink transmission parameters indicated in the medium-access-control control element.

A non-transitory computer-readable medium storing code for wireless communication at a UE is described. The code may include instructions executable by a processor to establish a connection with a base station via one or more transmission beams, receive, from the base station, a medium-access-control control element that indicates a sounding reference signal is to be transmitted to the base station and spatial relation information for the transmission of the sounding reference signal, where the spatial relation information indicates one or more uplink transmission parameters for transmission of the sounding reference signal via the one or more transmission beams, and transmit the sounding reference signal to the base station using the one or more uplink transmission parameters indicated in the medium-access-control control element.

In some examples of the method, apparatuses, and non-transitory computer-readable medium described herein, the sounding reference signal includes an aperiodic, periodic, and semi-persistent sounding reference signal.

In some examples of the method, apparatuses, and non-transitory computer-readable medium described herein, the sounding reference signal may be transmitted for one or more of a beam management procedure, codebook or non-codebook precoding procedure, antenna switching procedure, or any combinations thereof.

In some examples of the method, apparatuses, and non-transitory computer-readable medium described herein, the spatial relation information in the medium-access-control control element may be provided for each of one or more sounding reference signal resources.

In some examples of the method, apparatuses, and non-transitory computer-readable medium described herein, the spatial relation information in the medium-access-control control element identifies a location of the sounding reference signal in a time-frequency resource grid.

In some examples of the method, apparatuses, and non-transitory computer-readable medium described herein, the spatial relation information in the medium-access-control control element indicates one or more of a serving cell index, a sounding reference signal bandwidth part index, a synchronization signal block index, a channel state information reference signal index, a sounding reference signal resource index, or any combinations thereof.

A method of wireless communication at a base station is described. The method may include configuring a UE with a set of available spatial relations for transmitting a sounding reference signal to the base station, each spatial relation of the set of available spatial relations indicating one or more uplink transmission parameters for transmission of the sounding reference signal, transmitting, to the UE, a medium-access-control control element that indicates the sounding reference signal is to be transmitted by the UE and a first spatial relation of the set of available spatial relations to be used for the sounding reference signal, and receiving the sounding reference signal from the UE based on the one or more uplink transmission parameters indicated in the first spatial relation.

An apparatus for wireless communication at a base station is described. The apparatus may include a processor, memory coupled to the processor, and the processor and memory configured to: configure a UE with a set of available spatial relations for transmitting a sounding reference signal to the base station, each spatial relation of the set of available spatial relations indicating one or more uplink transmission parameters for transmission of the sounding reference signal, transmit, to the UE, a medium-access-control control element that indicates the sounding reference signal is to be transmitted by the UE and a first spatial relation of the set of available spatial relations to be used for the sounding reference signal, and receive the sounding reference signal from the UE based on the one or more uplink transmission parameters indicated in the first spatial relation.

Another apparatus for wireless communication at a base station is described. The apparatus may include means for configuring a UE with a set of available spatial relations for transmitting a sounding reference signal to the base station, each spatial relation of the set of available spatial relations indicating one or more uplink transmission parameters for transmission of the sounding reference signal, transmitting, to the UE, a medium-access-control control element that indicates the sounding reference signal is to be transmitted by the UE and a first spatial relation of the set of available spatial relations to be used for the sounding reference signal, and receiving the sounding reference signal from the UE based on the one or more uplink transmission parameters indicated in the first spatial relation.

A non-transitory computer-readable medium storing code for wireless communication at a base station is described. The code may include instructions executable by a processor to configure a UE with a set of available spatial relations for transmitting a sounding reference signal to the base station, each spatial relation of the set of available spatial relations indicating one or more uplink transmission parameters for transmission of the sounding reference signal, transmit, to the UE, a medium-access-control control element that indicates the sounding reference signal is to be transmitted by the UE and a first spatial relation of the set of available spatial relations to be used for the sounding reference signal, and receive the sounding reference signal from the UE based on the one or more uplink transmission parameters indicated in the first spatial relation.

In some examples of the method, apparatuses, and non-transitory computer-readable medium described herein, the sounding reference signal includes an aperiodic, periodic, and semi-persistent sounding reference signal.

In some examples of the method, apparatuses, and non-transitory computer-readable medium described herein, the sounding reference signal may be transmitted for one or more of a beam management procedure, codebook or non-codebook precoding procedure, antenna switching procedure, or any combinations thereof.

In some examples of the method, apparatuses, and non-transitory computer-readable medium described herein, the configuring the UE may include operations, features, means, or instructions for transmitting, to the UE, spatial relation information for physical uplink control channel communications that indicates the set of available spatial relations for transmitting the physical uplink control channel, each available spatial relation of the set of available spatial relations having a corresponding physical uplink control channel spatial relation information identification.

In some examples of the method, apparatuses, and non-transitory computer-readable medium described herein, the medium-access-control control element indicates a physical uplink control channel spatial relation information identification associated with the first spatial relation may be to be used for the sounding reference signal.

In some examples of the method, apparatuses, and non-transitory computer-readable medium described herein, the spatial relation information for physical uplink control channel communications may be transmitted in radio resource control signaling.

In some examples of the method, apparatuses, and non-transitory computer-readable medium described herein, the configuring the UE may include operations, features, means, or instructions for transmitting, to the UE, spatial relation information that indicates the set of available spatial relations for sounding reference signal transmissions, each available spatial relation of the set of available spatial relations having a corresponding sounding reference signal spatial relation information identification.

In some examples of the method, apparatuses, and non-transitory computer-readable medium described herein, the medium-access-control control element indicates a sounding reference signal spatial relation information identification associated with the first spatial relation may be to be used for the sounding reference signal.

In some examples of the method, apparatuses, and non-transitory computer-readable medium described herein, the spatial relation information for sounding reference signal transmissions may be transmitted in radio resource control signaling.

In some examples of the method, apparatuses, and non-transitory computer-readable medium described herein, the set of available spatial relations may be determined for each bandwidth part or component carrier that may be available for transmission of a sounding reference signal.

In some examples of the method, apparatuses, and non-transitory computer-readable medium described herein, the set of available spatial relations may be determined for one or more sounding reference signal resources that may be available for sounding reference signal transmissions.

In some examples of the method, apparatuses, and non-transitory computer-readable medium described herein, each spatial relation of the set of available spatial relations indicates one or more of a serving cell index, a sounding reference signal bandwidth part index, a synchronization signal block index, a channel state information reference signal index, a sounding reference signal resource index, or any combinations thereof.

A method of wireless communication at a base station is described. The method may include establishing a connection with a UE via one or more transmission beams, transmitting, to the UE, a medium-access-control control element that indicates a sounding reference signal is to be transmitted by the UE and spatial relation information for the transmission of the sounding reference signal, where the spatial relation information indicates one or more uplink transmission parameters for transmission of the sounding reference signal via the one or more transmission beams, and receiving the sounding reference signal from the UE based on the one or more uplink transmission parameters indicated in the medium-access-control control element.

An apparatus for wireless communication at a base station is described. The apparatus may include a processor, memory coupled to the processor, and the processor and memory configured to: establish a connection with a UE via one or more transmission beams, transmit, to the UE, a medium-access-control control element that indicates a sounding reference signal is to be transmitted by the UE and spatial relation information for the transmission of the sounding reference signal, where the spatial relation information indicates one or more uplink transmission parameters for transmission of the sounding reference signal via the one or more transmission beams, and receive the sounding reference signal from the UE based on the one or more uplink transmission parameters indicated in the medium-access-control control element.

Another apparatus for wireless communication at a base station is described. The apparatus may include means for establishing a connection with a UE via one or more transmission beams, transmitting, to the UE, a medium-access-control control element that indicates a sounding reference signal is to be transmitted by the UE and spatial relation information for the transmission of the sounding reference signal, where the spatial relation information indicates one or more uplink transmission parameters for transmission of the sounding reference signal via the one or more transmission beams, and receiving the sounding reference signal from the UE based on the one or more uplink transmission parameters indicated in the medium-access-control control element.

A non-transitory computer-readable medium storing code for wireless communication at a base station is described. The code may include instructions executable by a processor to establish a connection with a UE via one or more transmission beams, transmit, to the UE, a medium-access-control control element that indicates a sounding reference signal is to be transmitted by the UE and spatial relation information for the transmission of the sounding reference signal, where the spatial relation information indicates one or more uplink transmission parameters for transmission of the sounding reference signal via the one or more transmission beams, and receive the sounding reference signal from the UE based on the one or more uplink transmission parameters indicated in the medium-access-control control element.

In some examples of the method, apparatuses, and non-transitory computer-readable medium described herein, the sounding reference signal includes an aperiodic, periodic, and semi-persistent sounding reference signal.

In some examples of the method, apparatuses, and non-transitory computer-readable medium described herein, the sounding reference signal may be transmitted for one or more of a beam management procedure, codebook or non-codebook precoding procedure, antenna switching procedure, or any combinations thereof.

In some examples of the method, apparatuses, and non-transitory computer-readable medium described herein, the spatial relation information in the medium-access-control control element may be provided for each of one or more sounding reference signal resources.

In some examples of the method, apparatuses, and non-transitory computer-readable medium described herein, the spatial relation information in the medium-access-control control element identifies a sounding reference signal transmission beam for the transmission of the sounding reference signal.

In some examples of the method, apparatuses, and non-transitory computer-readable medium described herein, the spatial relation information in the MAC-CE indicates one or more of a serving cell index, a sounding reference signal bandwidth part index, a synchronization signal block index, a channel state information reference signal index, a sounding reference signal resource index, or any combinations thereof.

DETAILED DESCRIPTION

Figure 1:
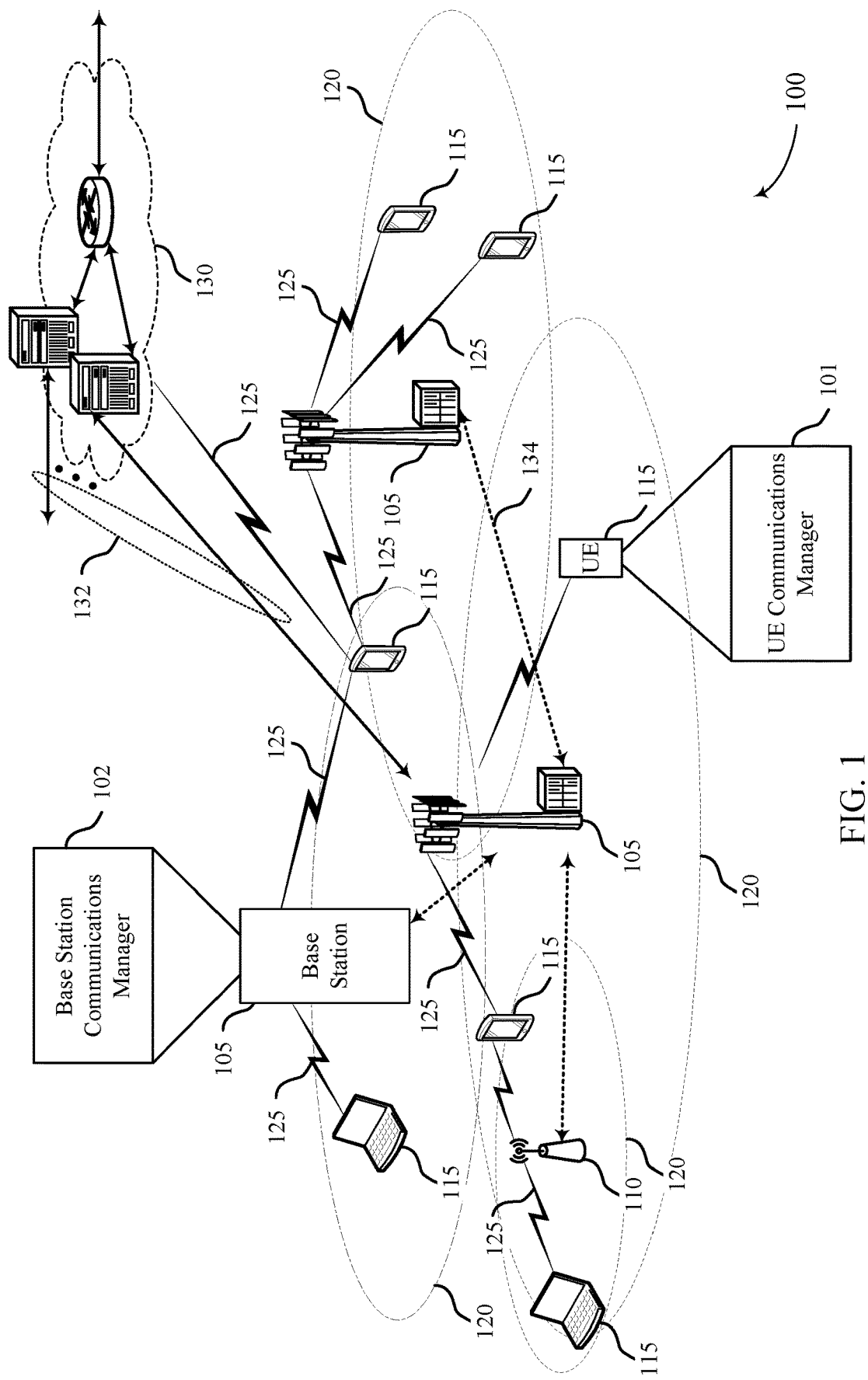
FIG. 1 illustrates an example of a system for wireless communications that supports uplink reference signal spatial relation identification techniques in accordance with aspects of the present disclosure.

Various aspects of the present disclosure relate to methods, systems, devices, and apparatuses that support efficient spatial relation selection techniques in wireless communications between a user equipment (UE) and a base station. In some cases, a base station and a UE may establish a connection using one or more bandwidth parts (BWPs) or component carriers (CCs). The UE and base station may periodically or non-periodically perform one or more of a beam management procedure, codebook or non-codebook precoding procedure, antenna switching procedure, and determine one or more transmission parameters (e.g., spatial relations, beamforming parameters, etc.), used for communications based on such procedures. For example, UE movement relative to the base station may result in one or more spatial relations becoming outdated and different spatial relations selected for one or more transmissions. Spatial relations may refer to configuration of the spatial relation or precoding parameters between a reference signal (e.g., a synchronization signal in a synchronization signal block (SSB), a channel state information reference signal (CSI-RS), or a sounding reference signal (SRS)) and an uplink transmission (e.g., a physical uplink control channel (PUCCH) transmission).

In some cases, spatial relations for transmitting a SRS from a UE to a base station may be indicated to the UE using a medium-access-control control element (MAC-CE). Providing such spatial relations in a MAC-CE may allow for reduced latency and overhead reduction in providing updated spatial relations relative to, for example, radio resource control (RRC) signaling. The spatial relations indicated in the MAC-CE may be used in, for example, a beam management procedure, codebook or non-codebook precoding procedure, antenna switching procedure, of any combinations thereof. In some cases, the SRS includes an aperiodic, periodic, and semi-persistent SRS.

According to some aspects of the present disclosure, a base station may configure a set or pool of available spatial relations for use in SRS transmissions, and the MAC-CE may indicate which spatial relation of the set of available spatial relations is to be used. In some cases, a set of spatial relations may be configured for PUCCH transmissions, which may also be used for SRS transmissions, and the MAC-CE may indicate an index value that indicates a particular spatial relation of the set that is to be used for SRS. In some cases, the base station may separately configure, such as through RRC signaling, a separate set of spatial relations for SRS transmissions, which may be overlapping or non-overlapping with the set of spatial relations configured for PUCCH transmissions. In other cases, the MAC-CE may provide all of the spatial relation information for an associated SRS transmission, such as, for example, a serving cell index, a SRS BWP index, a SSB index, a CSI-RS index, a SRS resource index, or any combinations thereof. The UE, responsive to receiving the MAC-CE, may transmit a SRS to the base station using the indicated spatial relation.

Such techniques may allow for efficient beam management when an existing transmission beam quality has degraded, and thus provide more efficient and reliable communications. Such techniques may be employed, in some examples, in a system that uses beamforming and where a UE is moving within a coverage area. Accordingly, techniques such as discussed herein may enhance beam management procedures for such situations through faster and more efficient beam refinement.

Aspects of the disclosure are initially described in the context of a wireless communications system. Aspects of the disclosure are further illustrated by and described with reference to apparatus diagrams, system diagrams, and flowcharts that relate to uplink reference signal spatial relation identification techniques.

FIG. 1 illustrates an example of a wireless communications system 100 that supports uplink reference signal spatial relation identification techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 11 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

UE 115 may include UE communications manager 101, which in some cases may determine a set of available spatial relations for transmitting a SRS to a base station 105, each spatial relation of the set of available spatial relations indicating one or more uplink transmission parameters for transmission of a SRS, receive, from the base station 105, a MAC-CE that indicates a SRS is to be transmitted to the base station 105 and a first spatial relation of the set of available spatial relations to be used for the SRS, and transmit the SRS to the base station using the one or more uplink transmission parameters indicated in the first spatial relation. In some cases, the UE communications manager 101 may establish a connection with a base station 105 via one or more transmission beams, receive, from the base station 105, a MAC-CE that indicates a SRS is to be transmitted to the base station 105 and spatial relation information for the transmission of the SRS, wherein the spatial relation information indicates one or more uplink transmission parameters for transmission of the SRS via the one or more transmission beams, transmit the SRS to the base station using the one or more uplink transmission parameters indicated in the medium-access-control control element.

Base station 105 may include base station communications manager 102, which may configure a UE 115 with a set of available spatial relations for transmitting a SRS to the base station 105, each spatial relation of the set of available spatial relations indicating one or more uplink transmission parameters for transmission of the SRS, transmit, to the UE 115, a MAC-CE that indicates the SRS is to be transmitted by the UE 115 and a first spatial relation of the set of available spatial relations to be used for the SRS, and receive the SRS from the UE 115 based at least in part on the one or more uplink transmission parameters indicated in the first spatial relation. In some cases, the base station 105 may establish a connection with a UE 115 via one or more transmission beams, transmit, to the UE 115, a MAC-CE that indicates a SRS is to be transmitted by the UE 115 and spatial relation information for the transmission of the SRS, where the spatial relation information indicates one or more uplink transmission parameters for transmission of the SRS via the one or more transmission beams, and receive the SRS from the UE 115 based at least in part on the one or more uplink transmission parameters indicated in the MAC-CE.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, spatial relations for one or more uplink reference signal transmissions, such as SRS transmissions, may be configured and a particular spatial relation indicated for a UE 115 to use in a MAC-CE. In some cases, a base station 105 may configure a set or pool of available spatial relations for use in SRS transmissions, and the MAC-CE may indicate which spatial relation of the set of available spatial relations is to be used. In some cases, a set of spatial relations may be configured for PUCCH transmissions, which may also be used for SRS transmissions, and the MAC-CE may indicate an index value that indicates a particular spatial relation of the set that is to be used for SRS. In some cases, the base station 105 may separately configure, through RRC signaling, a separate set of spatial relations for SRS transmissions, which may be overlapping or non-overlapping with the set of spatial relations configured for PUCCH transmissions. In other cases, the MAC-CE may provide all of the spatial relation information for an associated SRS transmission, such as, for example, a serving cell index, a SRS BWP index, a SSB index, a CSI-RS index, a SRS resource index, or any combinations thereof. The UE 115, responsive to receiving the MAC-CE, may transmit a SRS to the base station 105 using the indicated spatial relation.

Figure 2:
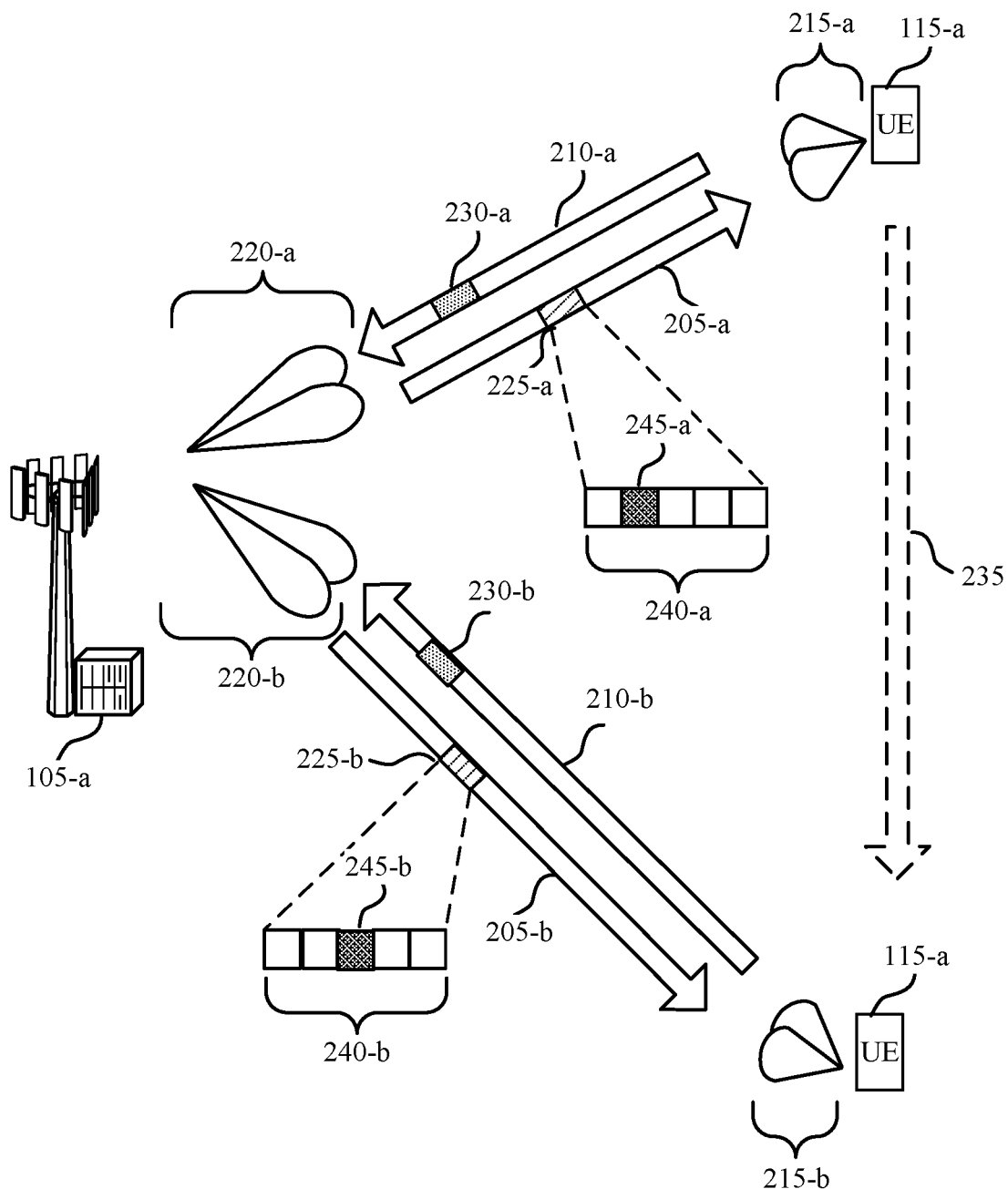
FIG. 2 illustrates an example of a portion of a wireless communications system that supports uplink reference signal spatial relation identification techniques in accordance with aspects of the present disclosure.

FIG. 2 illustrates an example of a wireless communications system 200 that supports uplink reference signal spatial relation identification techniques in accordance with aspects of the present disclosure. In some examples, wireless communications system 200 may implement aspects of wireless communication system 100. In the example of FIG. 2, wireless communications system 200 may include base station 105-a and UE 115-a, which may be examples of the corresponding devices described with respect to FIG. 1.

In some cases, base station 105-a and UE 115-a may establish communication via a first beam pair link (BPL), for example, between downlink beam 220-a and uplink beam 215-a. In this example, UE 115-a and base station 105-a may use beamformed communications to establish a downlink connection 205-a via a downlink beam 220-a and an uplink connection 210-a via an uplink beam 215-a. In some cases, the UE 115-a and base station 105-a may use corresponding beamforming parameters (e.g., spatial transmission or receive parameters) associated with a particular transmission beam to configure wireless communications hardware for transmitting/receiving beamformed transmissions in which a beam pair link may have coupled transmission beams with corresponding beamforming parameters. The beamforming parameters may include a particular spatial domain filter for uplink or downlink communications that is associated with a particular transmission beam. In cases with coupled transmission beams, the beamforming parameters of an uplink beam may be determined based on one or more reference signals that are received on a selected downlink beam which is quasi co-located (QCL) with the uplink beam. Two antenna ports are said to be QCL if properties of the channel over which a symbol on one antenna port is conveyed can be inferred from the channel over which a symbol on the other antenna port is conveyed.

In some cases, one or more beam pair links may be established through a beam sweep and beam refinement procedure in which the UE 115-a may measure one or more reference signals from the base station 105-a (e.g., channel state information reference signal (CSI-RS) transmissions) and provide measurement reports to the base station 105-a that are used to determine the beam pair links (BPL). Systems that employ transmission beams may use measurements related to multiple beams to identify a best, or most preferred beam to use in a BPL. For example, a first wireless device (e.g., base station 105-a) may perform a beam sweep (e.g., a P1 beam training procedure) in which consecutive beams having a relatively wide beam width are transmitted and may be measured at a second wireless device (e.g., UE 115-a) to identify a best beam (e.g., a beam with a highest RSRP) and provide an indication to the first wireless device of the preferred beam. In some cases, further beam refinements may be performed in which the first wireless device may transmit one or more reference signals (e.g., a channel state information (CSI) reference signal (CSI-RS) in a P2 (for downlink beams) and/or P3 (for uplink beams) beam training procedure to identify more focused beams for use in BPLs. In cases where a refined uplink beam is to be determined, the UE may transmit a number of SRS transmissions that may be measured to identify a preferred beam or beams.

After establishment of the first BPL, the UE 115-a and base station 105-a may periodically perform beam refinement procedures (e.g., one or more of P1, P2, or P3 procedures) or beam management procedures to help maintain communications using reliable transmission beams. In some cases, the base station 105-a may indicate a particular spatial relation 245-a to use for a SRS 230-a by transmitting a MAC-CE 225-a, which may indicate the spatial relation 245-a. In some cases, the UE 115-a may transmit a capability indication to the base station 105-a (e.g., in RRC signaling as part of a connection establishment) that indicates a capability of the UE 115-a to receive a MAC-CE 225-a with SRS spatial relation indication. The base station 105-a, in some cases, may trigger an aperiodic SRS transmission for a beam update based on the indicated capability of the UE 115-a, by providing a selected spatial relation 245-a for the SRS 230-a in the MAC-CE 225-a.

In some cases, a set or pool of candidate spatial relations for the MAC-CE 225-a to down-select per SRS resource on each BWP or CC may reuse a same pool of RRC configured spatial relations for MAC-CE to down select per PUCCH resource on same BWP or CC. The SRS resource may include at least an aperiodic SRS resource for beam management purposes. In such cases, the base station 105-a may provide the pool of candidate spatial relations 240-a for PUCCH transmissions by using information provided in "PUCCH-SpatialRelationInfo" from an information element as reproduced below in Table 1 (e.g., the fields of spatial relation info ID, serving cell ID, reference signal ID). The MAC-CE 225-a may indicate a selection of the spatial relation 245-a for the SRS 230-a based on the spatial relation information ID, in such cases.

TABLE 1

```
PUCCH-SpatialRelationInfo ::=            SEQUENCE {
    pucch-SpatialRelationInfoId              PUCCH-SpatialRelationInfoId,
    servingCellId                    ServCellIndex           OPTIONAL, -- Need S
    referenceSignal                  CHOICE {
        ssb-Index                        SSB-Index,
        csi-RS-Index                     NZP-CSI-RS-ResourceId,
        srs                          SEQUENCE {
            resource                     SRS-ResourceId,
            uplinkBWP                    BWP-Id
        }
    },
    pucch-PathlossReferenceRS-Id             PUCCH-PathlossReferenceRS-Id,
    p0-PUCCH-Id                      P0-PUCCH-Id,
    closedLoopIndex                  ENUMERATED { i0, i1 }
}
PUCCH-SpatialRelationInfoId ::=          INTEGER (1..maxNrofSpatialRelationInfos)
```

In other cases, the set or pool of candidate spatial relations 240-a for the MAC-CE 225-a to down-select per SRS resource on each BWP or CC may be provided in a separate pool of RRC configured spatial relations for MAC-CE 225-a to down select per SRS resource on a same BWP or CC. The SRS resource may include at least an aperiodic SRS resource for beam management purposes. In such cases, the base station 105-a may provide the pool of candidate spatial relations 240-a for SRS transmissions, such as by using information provided in "SRS-SpatialRelationInfo" information element as reproduced below in Table 2. The MAC-CE 225-a may indicate a selection of the spatial relation 245-a for the SRS 230-a based on the spatial relation information ID, in such cases.

TABLE 2

```
SRS-SpatialRelationInfo ::=  SEQUENCE {
    srs-SpatialRelationInfoId        SRS-SpatialRelationInfoId,
    servingCellId                ServCellIndex   OPTIONAL, -- Need S
    referenceSignal              CHOICE {
        ssb-Index                    SSB-Index,
        csi-RS-Index                 NZP-CSI-RS-ResourceId,
        srs                      SEQUENCE {
            resourceId                   SRS-ResourceId,
            uplinkBWP                    BWP-Id
        }
    }
}
```

In further cases, the spatial relation information 245-a for SRS 230-a may be indicated directly in MAC-CE 225-a. In such cases, there may be no RRC configured pool of candidate spatial relations for the MAC-CE 225-a to down-select per SRS resource, and the MAC-CE 225-a may directly indicate the spatial relation contents per SRS resource. In such cases, the MAC-CE 225-a may include, for example, one or more of a serving cell index, a SRS bandwidth part index, a SRS CC index, a SSB index, a CSI-RS index, a SRS resource index, or any combinations thereof.

In some examples, the UE 115-a may move from one location to another location, as indicated by movement indicator 235. Upon the relocation, UE 115-a may need to update configuration parameters, such as spatial relation information (e.g., beam direction, beam identifier, spatial stream. etc.). Based on the relocation, base station 105-a and UE 115-a may establish communication via a second beam pair link, for example, between downlink beam 220-b and uplink beam 215-b. In this example, UE 115-a and base station 105-a may use beamformed communications to establish a downlink connection 205-b via a downlink beam 220-b and an uplink connection 210-b via an uplink beam 215-b. The configuration of the second beam pair link may be similar to the configuration explained above with regard to the first beam pair link.

After establishment of the second BPL, the UE 115-a and base station 105-a may periodically perform beam refinement procedures (e.g., one or more of P1, P2, or P3 procedures) or beam management procedures to help maintain communications using reliable transmission beams. In some cases, the base station 105-a may indicate a particular spatial relation 245-b to use for a SRS 230-b by transmitting a MAC-CE 225-b, which may indicate the spatial relation 245-b. In some cases, the UE 115-a may transmit a capability indication to the base station 105-a (e.g., in RRC signaling as part of a connection establishment) that indicates a capability of the UE 115-a to receive a MAC-CE 225-b with SRS spatial relation indication. The base station 105-a, in some cases, may trigger an aperiodic SRS transmission for a beam update based on the indicated capability of the UE 115-a, by providing a selected spatial relation 245-b for the SRS 230-b in the MAC-CE 225-b.

In some cases, a set or pool of candidate spatial relations for the MAC-CE 225-b to down-select per SRS resource on each BWP or CC may reuse a same pool of RRC configured spatial relations for MAC-CE to down select per PUCCH resource on same BWP or CC. The SRS resource may include at least an aperiodic SRS resource for beam management purposes. In such cases, the base station 105-a may provide the pool of candidate spatial relations 240-b for PUCCH transmissions by using information provided in "PUCCH-SpatialRelationInfo" from an information element as reproduced below in Table 3 (e.g., the fields of spatial relation info ID, serving cell ID, reference signal ID). The MAC-CE 225-b may indicate a selection of the spatial relation 245-b for the SRS 230-b based on the spatial relation information ID, in such cases.

TABLE 3

```
PUCCH-SpatialRelationInfo ::=        SEQUENCE {
    pucch-SpatialRelationInfoId          PUCCH-SpatialRelationInfoId,
    servingCellId                        ServCellIndex           OPTIONAL, -- Need S
    referenceSignal                      CHOICE {
        ssb-Index                            SSB-Index,
        csi-RS-Index                         NZP-CSI-RS-ResourceId,
        srs                              SEQUENCE {
            resource                         SRS-ResourceId,
            uplinkBWP                        BWP-Id
                                         }
    },
    pucch-PathlossReferenceRS-Id         PUCCH-PathlossReferenceRS-Id,
    p0-PUCCH-Id                          P0-PUCCH-Id,
    closedLoopIndex                      ENUMERATED { i0, i1 }
}
PUCCH-SpatialRelationInfoId ::=      INTEGER (1..maxNrofSpatialRelationInfos)
```

In other cases, the set or pool of candidate spatial relations 240-b for the MAC-CE 225-b to down-select per SRS resource on each BWP or CC may be provided in a separate pool of RRC configured spatial relations for MAC-CE 225-b to down select per SRS resource on a same BWP or CC. The SRS resource may include at least an aperiodic SRS resource for beam management purposes. In such cases, the base station 105-a may provide the pool of candidate spatial relations 240-b for SRS transmissions, such as by using information provided in "SRS-SpatialRelationInfo" information element as reproduced below in Table 4. The MAC-CE 225-b may indicate a selection of the spatial relation 245-b for the SRS 230-b based on the spatial relation information ID, in such cases.

TABLE 4

```
SRS-SpatialRelationInfo ::=      SEQUENCE {
    srs-SpatialRelationInfoId        SRS-SpatialRelationInfoId,
    servingCellId                    ServCellIndex   OPTIONAL, -- Need S
    referenceSignal                  CHOICE {
        ssb-Index                        SSB-Index,
        csi-RS-Index                     NZP-CSI-RS-ResourceId,
        srs                          SEQUENCE {
            resourceId                   SRS-ResourceId,
            uplinkBWP                    BWP-Id
                                     }
    }
}
```

In further cases, the spatial relation information 245-b for SRS 230-b may be indicated directly in MAC-CE 225-b. In such cases, there may be no RRC configured pool of candidate spatial relations for the MAC-CE 225-b to down-select per SRS resource, and the MAC-CE 225-b may directly indicate the spatial relation contents per SRS resource. In such cases, the MAC-CE 225-b may include, for example, one or more of a serving cell index, a SRS bandwidth part index, a SRS CC index, a SSB index, a CSI-RS index, a SRS resource index, or any combinations thereof.

Figure 3:
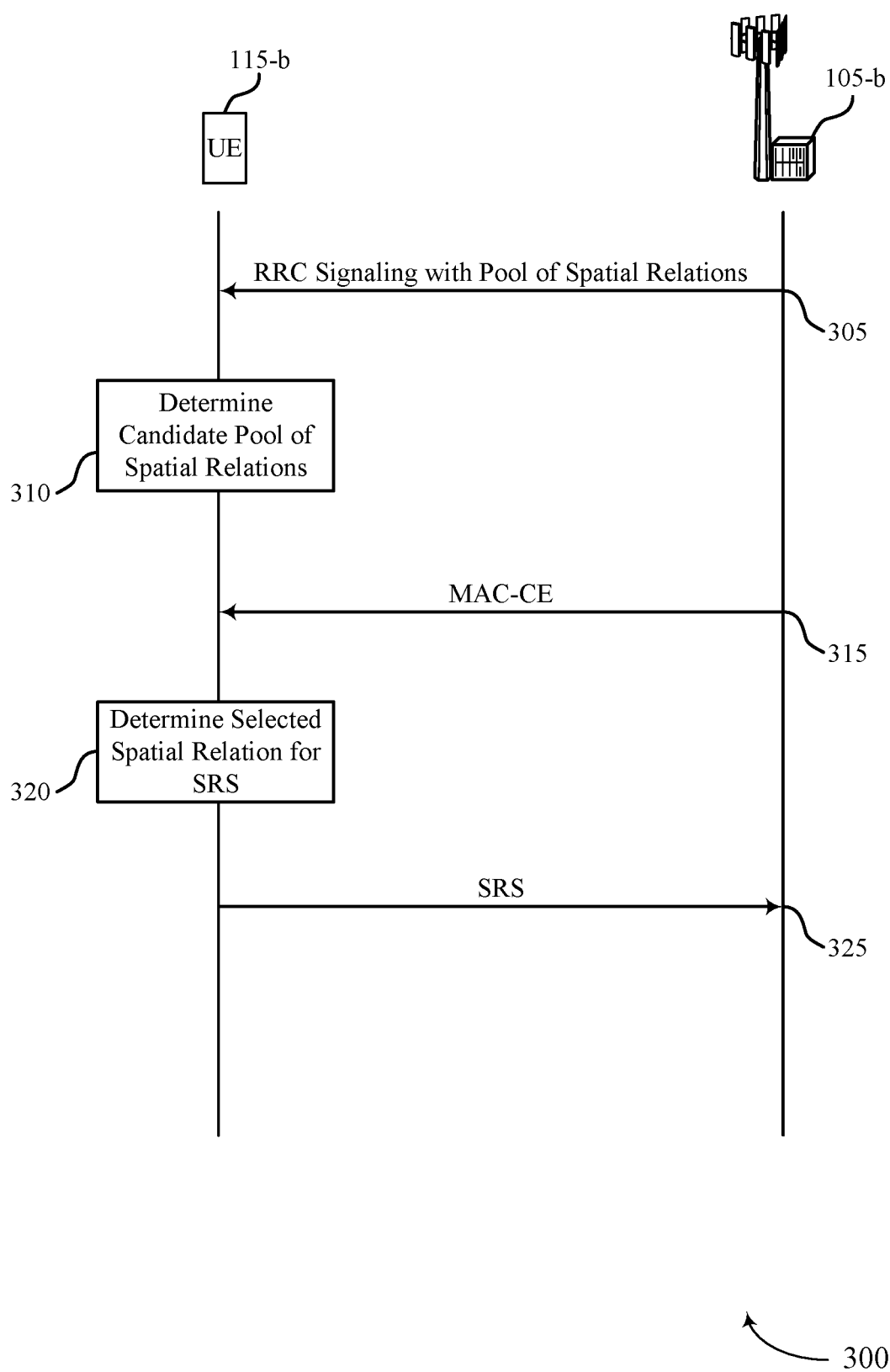
FIG. 3 illustrates an example of a process flow that supports uplink reference signal spatial relation identification techniques in accordance with aspects of the present disclosure.

FIG. 3 illustrates an example of a process flow 300 that supports uplink reference signal spatial relation identification techniques in accordance with aspects of the present disclosure. In some examples, process flow 300 may implement aspects of wireless communication system 100 or 200. Process flow 300 illustrates aspects of techniques performed by a base station 105-*b*, which may be an example of a base station 105 described with reference to FIGS. 1-2. Process flow 300 also illustrates aspects of techniques performed by a UE 115-*b*, which may be an example of a UE 115 described with reference to FIGS. 1-2.

At 305, base station 105-*b* may transmit RRC signaling to the UE 115-*b* that indicates a pool of available spatial relations for transmission of SRS communications to the base station 105-*b*. In some cases, the RRC signaling may be signaling that identifies a pool of spatial relations for PUCCH transmissions, and all or a portion of the PUCCH spatial relations may also be used to indicate SRS spatial relations (e.g., SRS spatial relations may be a certain partition of the PUCCH spatial relations candidate pool). In other cases, the RRC signaling may provide a separate candidate pool of spatial relations for SRS that may be different than the pool of PUCCH spatial relations.

At 310, the UE 115-*b* may identify the candidate pool of spatial relations. In some cases, the UE 115-*b* may store the list of candidate spatial relations in memory, with each candidate spatial relation having an associated ID or index.

At 315, the base station 105-*b* may transmit a MAC-CE that indicates a selected spatial relation for an SRS transmission. In some cases, the MAC-CE may indicate the ID or index value of the candidate spatial relation from the candidate pool of spatial relations.

At 320, the UE 115-*b* may determine the selected spatial relation for transmission of the SRS. At 325, the UE 115-*b* may transmit the SRS in accordance with the spatial relation indicated in the MAC-CE.

Figure 4:
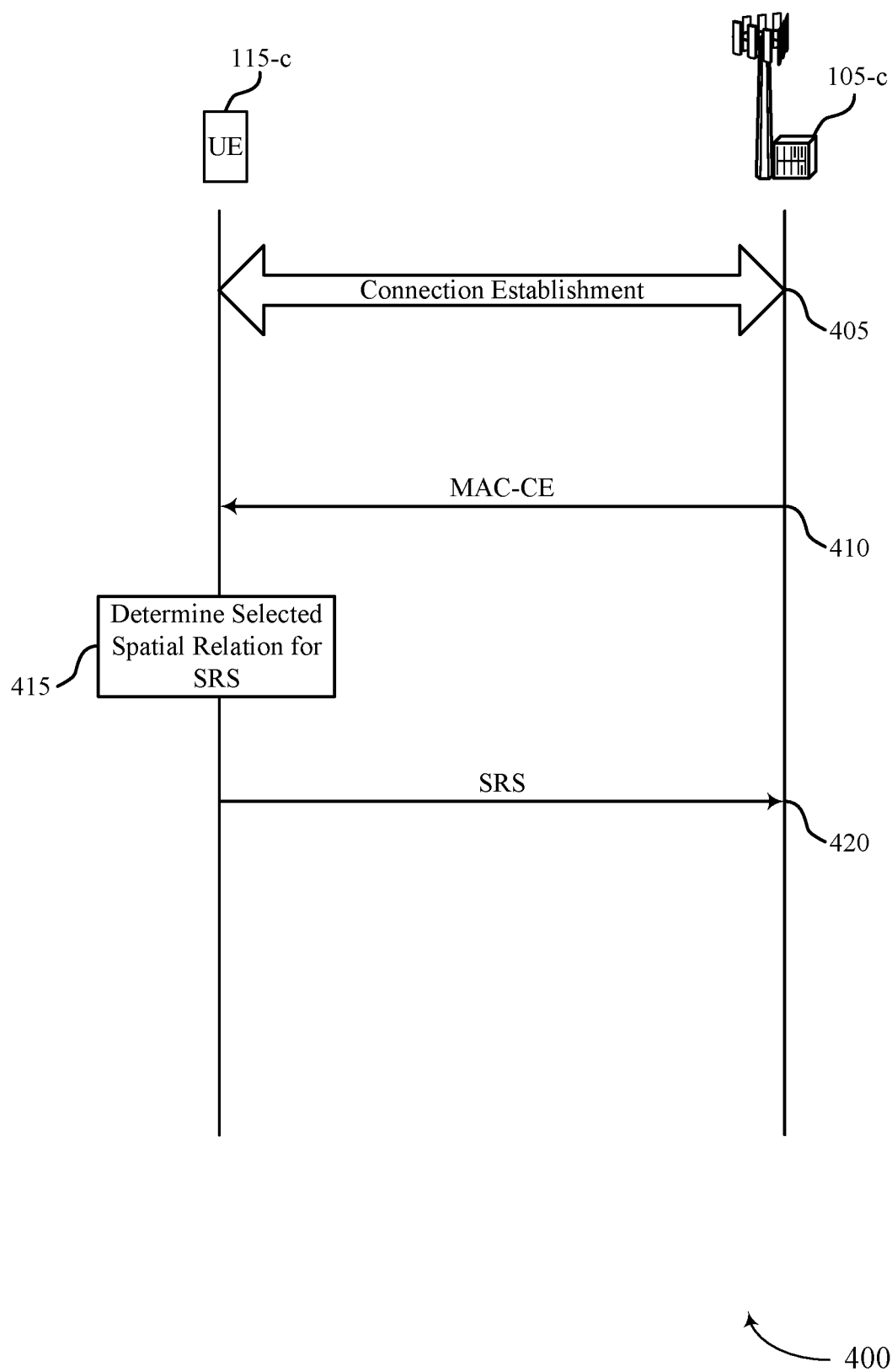
FIG. 4 illustrates an example of a process flow that supports uplink reference signal spatial relation identification techniques in accordance with aspects of the present disclosure.

FIG. 4 illustrates an example of a process flow 400 that supports uplink reference signal spatial relation identification techniques in accordance with aspects of the present disclosure. In some examples, process flow 400 may implement aspects of wireless communication system 100 or 200. Process flow 400 illustrates aspects of techniques performed by a base station 105-*c*, which may be an example of a base station 105 described with reference to FIGS. 1-2. Process flow 400 also illustrates aspects of techniques performed by a UE 115-*c*, which may be an example of a UE 115 described with reference to FIGS. 1-2.

At 405, base station 105-*c* and UE 115-*c* may perform a connection establishment procedure to establish a wireless connection. Such a connection establishment may be performed in accordance with established connection establishment procedures, and may include the exchange of RRC signaling to establish configurations for transmissions. In some cases, the UE 115-*c* may transmit a capability indication to the base station of a UE capability to support MAC-CE based indication of spatial relation information for SRS transmissions.

At 410, the base station 105-*c* may transmit a MAC-CE that indicates a selected spatial relation for an SRS transmission. In this example, there may be no RRC configured pool of candidate spatial relations for the MAC-CE to down-select per SRS resource, and the MAC-CE may directly indicate the spatial relation contents per SRS resource. In some cases, the MAC-CE may include one or more of a serving cell index, a SRS bandwidth part index, a SRS CC index, a SSB index, a CSI-RS index, a SRS resource index, or any combinations thereof.

At 420, the UE 115-*c* may determine the selected spatial relation for transmission of the SRS. At 425, the UE 115-*c* may transmit the SRS in accordance with the spatial relation indicated in the MAC-CE.

Figure 5:
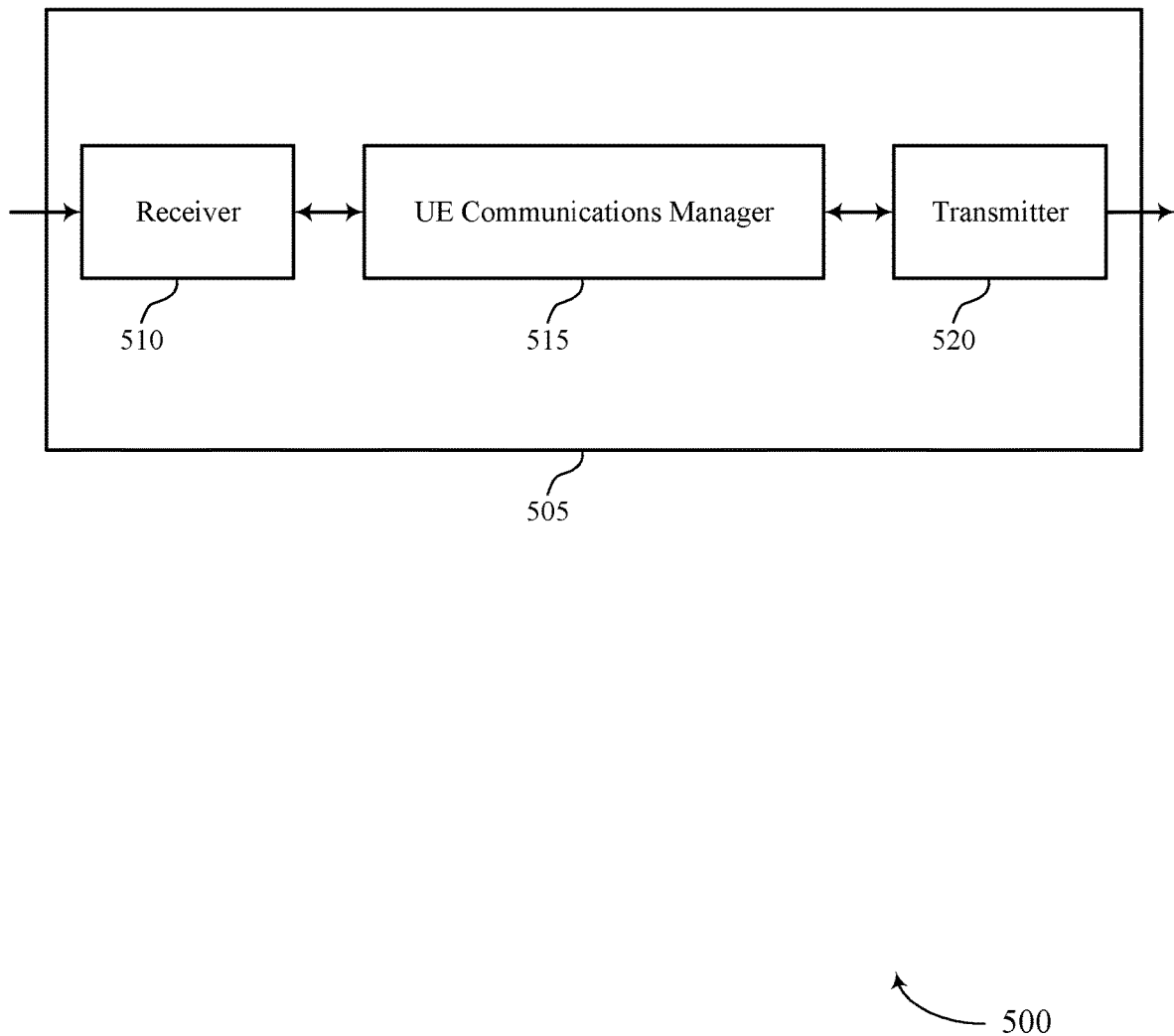
FIGS. 5 and 6 show block diagrams of devices that support uplink reference signal spatial relation identification techniques in accordance with aspects of the present disclosure.

FIG. 5 shows a block diagram 500 of a device 505 that supports uplink reference signal spatial relation identification techniques in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink reference signal spatial relation identification techniques, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine a set of available spatial relations for transmitting a SRS to a base station, each spatial relation of the set of available spatial relations indicating one or more uplink transmission parameters for transmission of a SRS, receive, from the base station, a MAC-CE that indicates an SRS is to be transmitted to the base station and a first spatial relation of the set of available spatial relations to be used for the SRS, and transmit the SRS to the base station using the one or more uplink transmission parameters indicated in the first spatial relation.

The UE communications manager 515 may also establish a connection with a base station via one or more transmission beams, receive, from the base station, a MAC-CE that indicates a SRS is to be transmitted to the base station and spatial relation information for the transmission of the SRS, where the spatial relation information indicates one or more uplink transmission parameters for transmission of the SRS via the one or more transmission beams, and transmit the SRS to the base station using the one or more uplink transmission parameters indicated in the medium-access-control control element. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
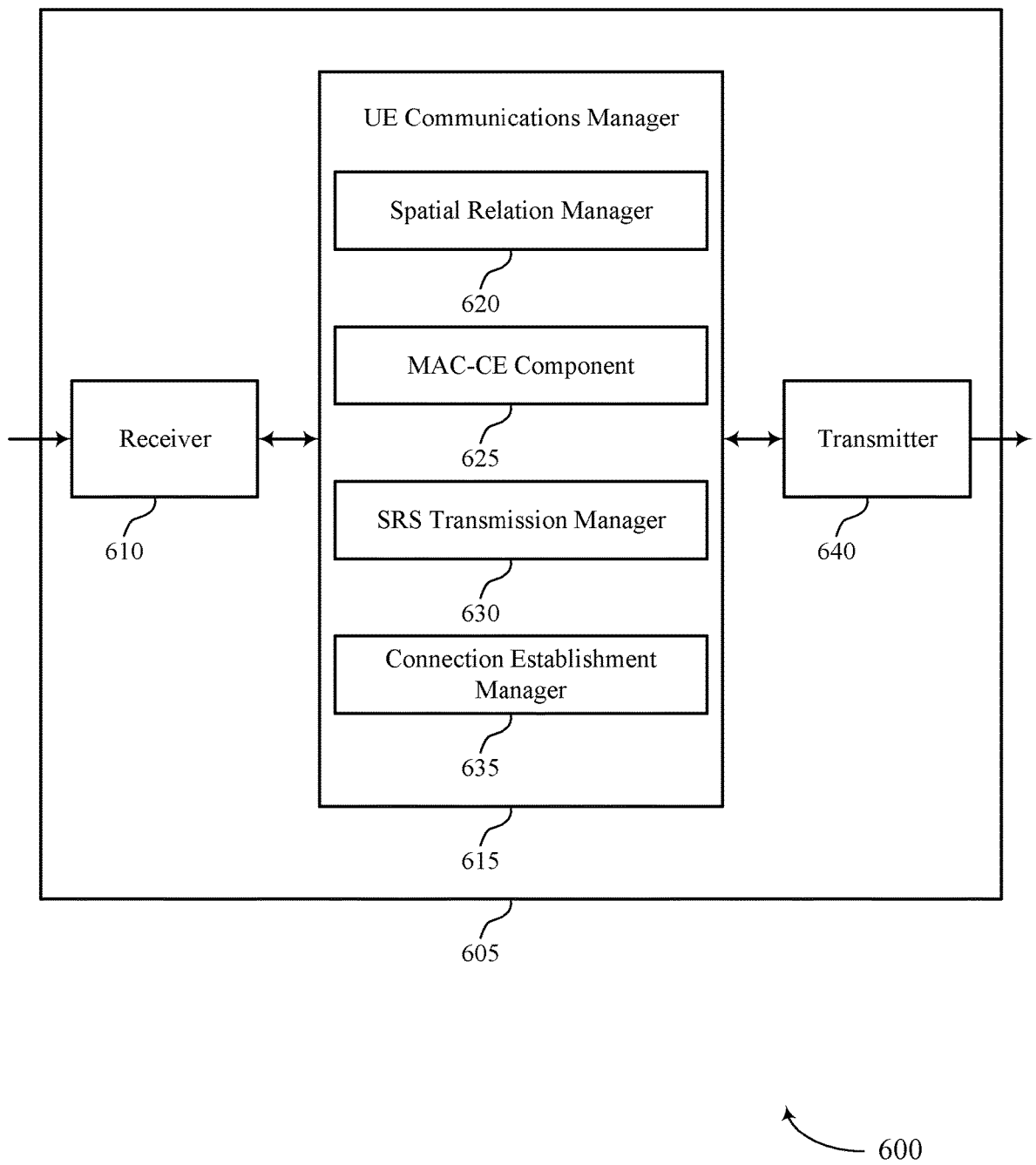

FIG. 6 shows a block diagram 600 of a device 605 that supports uplink reference signal spatial relation identification techniques in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to uplink reference signal spatial relation identification techniques, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a spatial relation manager 620, a MAC-CE component 625, a SRS transmission manager 630, and a connection establishment manager 635. The UE communications manager 615 may be an example of aspects of the UE communications manager 810 described herein.

The actions performed by the UE communications manager 615 as described herein may be implemented to realize increased utility. One implementation may allow a UE 115 to lower signaling or information overhead through efficient initiation and performance of one or more procedures to update transmission parameters. Another implementation may provide improved quality and reliability of service at the UE 115, as efficient beam management is introduced.

The spatial relation manager 620 may determine a set of available spatial relations for transmitting a SRS to a base station, each spatial relation of the set of available spatial relations indicating one or more uplink transmission parameters for transmission of a SRS.

The MAC-CE component 625 may receive, from the base station, a MAC-CE that indicates an SRS is to be transmitted to the base station and a first spatial relation of the set of available spatial relations to be used for the SRS. In other cases, the MAC-CE component 625 may receive, from the base station, a MAC-CE that indicates a SRS is to be transmitted to the base station and spatial relation information for the transmission of the SRS, where the spatial relation information indicates one or more uplink transmission parameters for transmission of the SRS via the one or more transmission beams.

The SRS transmission manager 630 may transmit the SRS to the base station using the one or more uplink transmission parameters indicated in the first spatial relation. In cases where the MAC-CE includes all of the information regarding the spatial relation, the SRS transmission manager 630 may transmit the SRS to the base station using the one or more uplink transmission parameters indicated in the MAC-CE.

The connection establishment manager 635 may establish a connection with a base station via one or more transmission beams.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
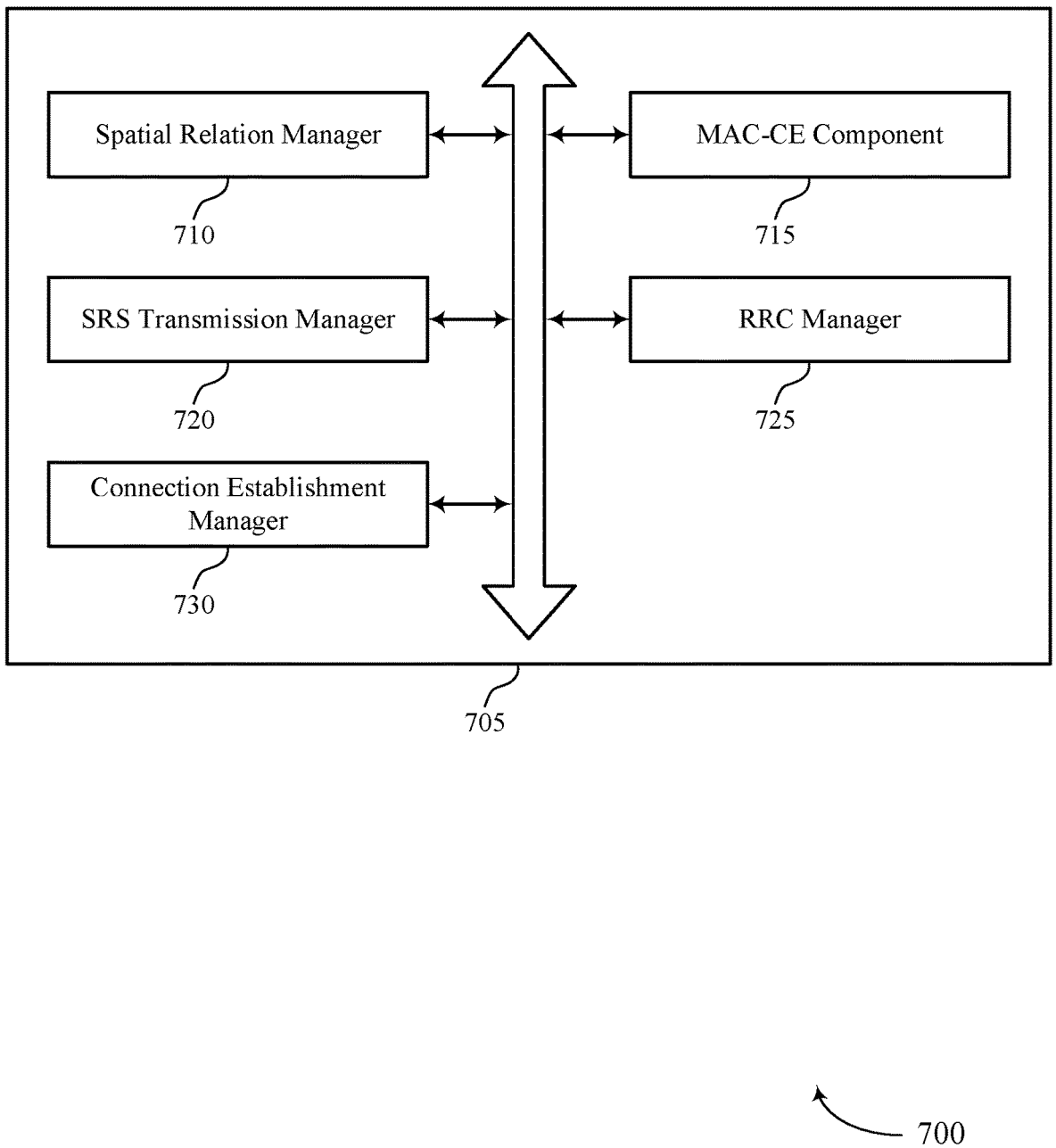
FIG. 7 shows a block diagram of a communications manager that supports uplink reference signal spatial relation identification techniques in accordance with aspects of the present disclosure.

FIG. 7 shows a block diagram 700 of a UE communications manager 705 that supports uplink reference signal spatial relation identification techniques in accordance with aspects of the present disclosure. The UE communications manager 705 may be an example of aspects of a UE communications manager 515, a UE communications manager 615, or a UE communications manager 810 described herein. The UE communications manager 705 may include a spatial relation manager 710, a MAC-CE component 715, a SRS transmission manager 720, a RRC manager 725, and a connection establishment manager 730. Each of these modules may communicate, directly or indirectly, with one another (e.g., via one or more buses).

The spatial relation manager 710 may determine a set of available spatial relations for transmitting a SRS to a base station, each spatial relation of the set of available spatial relations indicating one or more uplink transmission parameters for transmission of a SRS. In some examples, the spatial relation manager 710 may receive spatial relation information for physical uplink control channel (PUCCH) communications that indicates the set of available spatial relations for transmitting the PUCCH, each available spatial relation of the set of available spatial relations having a corresponding PUCCH spatial relation information identification. In some examples, the spatial relation manager 710 may receive spatial relation information that indicates the set of available spatial relations for SRS transmissions, each available spatial relation of the set of available spatial relations having a corresponding SRS spatial relation information identification. In some cases, the set of available spatial relations is determined for each bandwidth part or component carrier that is available for transmission of a SRS. In some cases, the set of available spatial relations is determined for one or more SRS resources that are available for SRS transmissions. In some cases, each spatial relation of the set of available spatial relations indicates a serving cell index, a SRS bandwidth part index, a synchronization signal block index, a channel state information reference signal resource index, a SRS resource index, or any combinations thereof.

The MAC-CE component 715 may receive, from the base station, a MAC-CE that indicates an SRS is to be transmitted to the base station and a first spatial relation of the set of available spatial relations to be used for the SRS. In some cases, the MAC-CE indicates a PUCCH spatial relation information identification associated with the first spatial relation is to be used for the SRS. In some cases, the MAC-CE indicates a SRS spatial relation information identification associated with the first spatial relation is to be used for the SRS.

In some examples, the MAC-CE component 715 may receive, from the base station, a MAC-CE that indicates a SRS is to be transmitted to the base station and spatial relation information for the transmission of the SRS, where the spatial relation information indicates one or more uplink transmission parameters for transmission of the SRS via the one or more transmission beams. In some cases, the spatial relation information in the MAC-CE is provided for each of one or more SRS resources.

The SRS transmission manager 720 may transmit the SRS to the base station using the one or more uplink transmission parameters indicated in the first spatial relation, or using the one or more uplink transmission parameters indicated in the MAC-CE.

In some cases, the SRS includes an aperiodic, periodic, and semi-persistent SRS. In some cases, the SRS is transmitted for one or more of a beam management procedure, codebook or non-codebook precoding procedure, antenna switching procedure, or any combinations thereof.

The connection establishment manager 730 may establish a connection with a base station via one or more transmission beams.

The RRC manager 725 may manage RRC signaling between the UE and a base station. In some cases, the spatial relation information for the PUCCH is received in radio resource control signaling. In some cases, the spatial relation information for SRS transmissions is received in radio resource control signaling.

Figure 8:
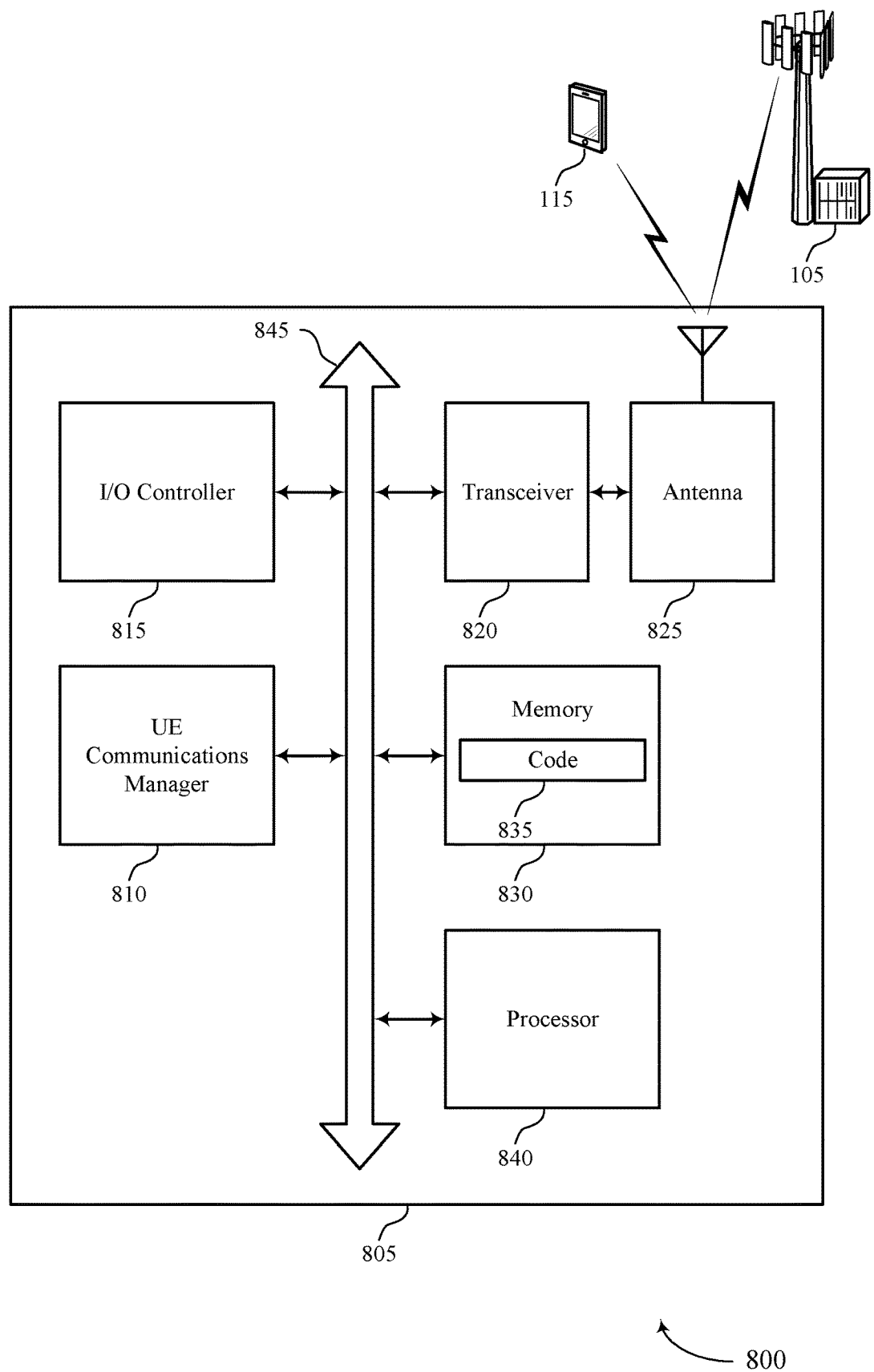
FIG. 8 shows a diagram of a system including a device that supports uplink reference signal spatial relation identification techniques in accordance with aspects of the present disclosure.

FIG. 8 shows a diagram of a system 800 including a device 805 that supports uplink reference signal spatial relation identification techniques in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine a set of available spatial relations for transmitting a SRS to a base station, each spatial relation of the set of available spatial relations indicating one or more uplink transmission parameters for transmission of a SRS, receive, from the base station, a MAC-CE that indicates an SRS is to be transmitted to the base station and a first spatial relation of the set of available spatial relations to be used for the SRS, and transmit the SRS to the base station using the one or more uplink transmission parameters indicated in the first spatial relation.

The UE communications manager 810 may also establish a connection with a base station via one or more transmission beams, receive, from the base station, a MAC-CE that indicates a SRS is to be transmitted to the base station and spatial relation information for the transmission of the SRS, where the spatial relation information indicates one or more uplink transmission parameters for transmission of the SRS via the one or more transmission beams, and transmit the SRS to the base station using the one or more uplink transmission parameters indicated in the medium-access-control control element.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink reference signal spatial relation identification techniques).

Through reduced computational complexity, a processor 840 of UE 115 may save power and increase battery life through efficient beam management. Another implementation may provide improved quality and reliability of service at the UE 115, as latency and the number of separate resources allocated to the UE 115 may be reduced.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
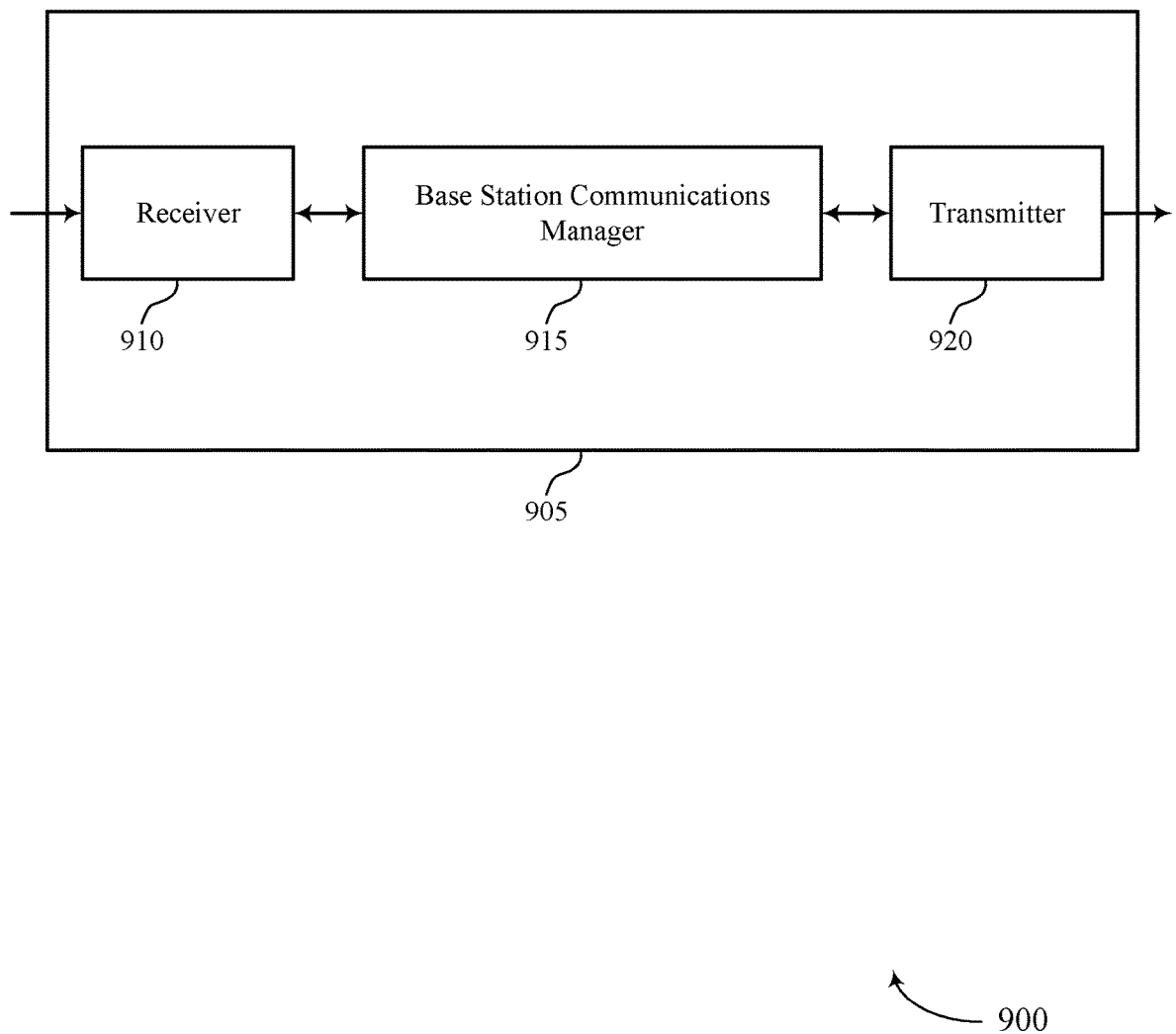
FIGS. 9 and 10 show block diagrams of devices that support uplink reference signal spatial relation identification techniques in accordance with aspects of the present disclosure.

FIG. 9 shows a block diagram 900 of a device 905 that supports uplink reference signal spatial relation identification techniques in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink reference signal spatial relation identification techniques, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may configure a UE with a set of available spatial relations for transmitting a SRS to the base station, each spatial relation of the set of available spatial relations indicating one or more uplink transmission parameters for transmission of the SRS, transmit, to the UE, a MAC-CE that indicates the SRS is to be transmitted by the UE and a first spatial relation of the set of available spatial relations to be used for the SRS, and receive the SRS from the UE based on the one or more uplink transmission parameters indicated in the first spatial relation.

The base station communications manager 915 may also establish a connection with a UE via one or more transmission beams, transmit, to the UE, a MAC-CE that indicates a SRS is to be transmitted by the UE and spatial relation information for the transmission of the SRS, where the spatial relation information indicates one or more uplink transmission parameters for transmission of the SRS via the one or more transmission beams, and receive the SRS from the UE based on the one or more uplink transmission parameters indicated in the medium-access-control control element. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
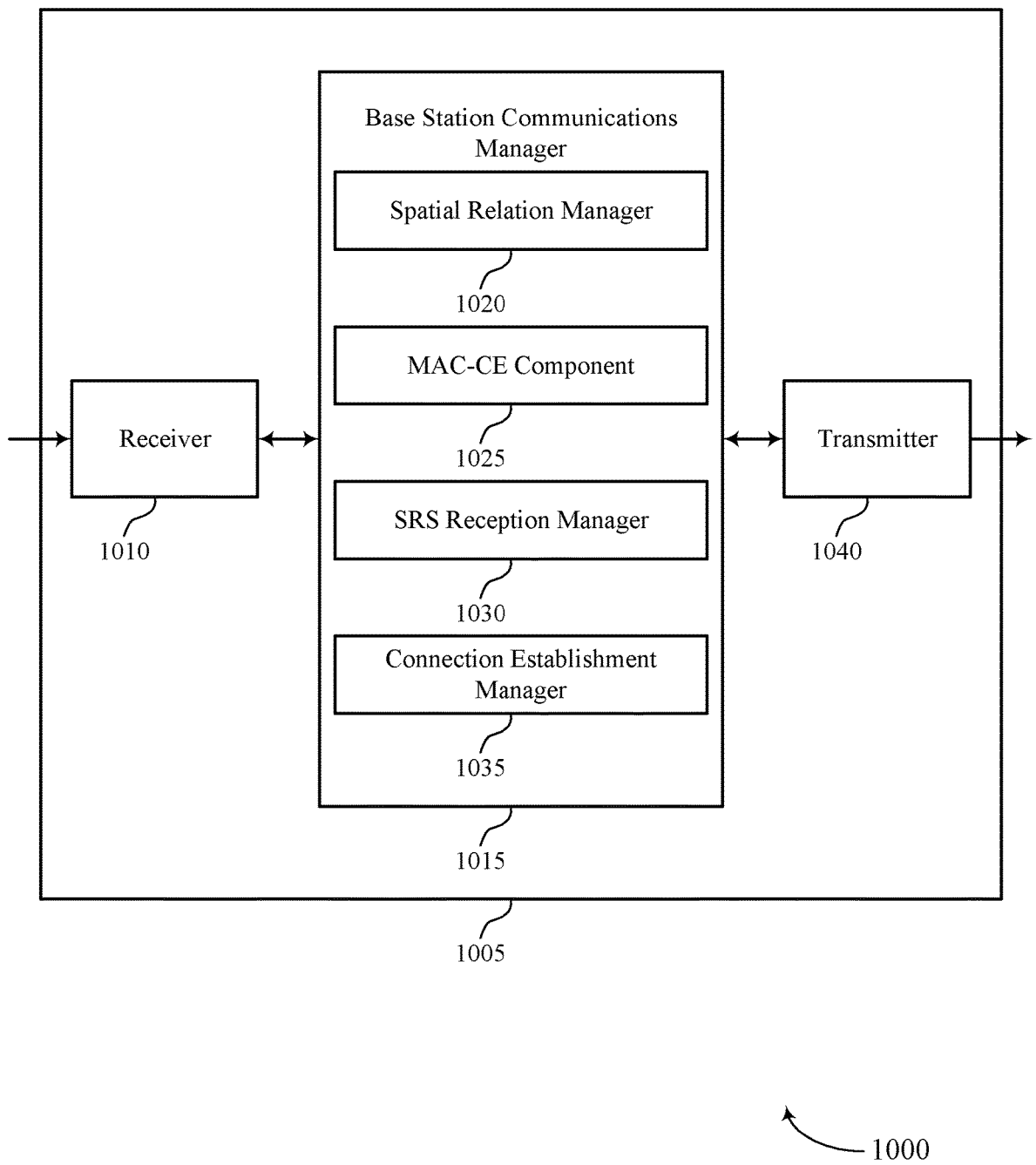

FIG. 10 shows a block diagram 1000 of a device 1005 that supports uplink reference signal spatial relation identification techniques in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink reference signal spatial relation identification techniques, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a spatial relation manager 1020, a MAC-CE component 1025, a SRS reception manager 1030, and a connection establishment manager 1035. The base station communications manager 1015 may be an example of aspects of the base station communications manager 1210 described herein.

The actions performed by the base station communications manager 1015 as described herein may be implemented to increased utility. One implementation may allow a base station 105 to lower signaling or information overhead through enhanced beam management procedures. Another implementation may provide improved quality and reliability of service at the base station 105, as latency is reduced via faster and more efficient beam refinement.

The spatial relation manager 1020 may configure a UE with a set of available spatial relations for transmitting a SRS to the base station, each spatial relation of the set of available spatial relations indicating one or more uplink transmission parameters for transmission of the SRS.

The MAC-CE component 1025 may transmit, to the UE, a MAC-CE that indicates the SRS is to be transmitted by the UE and a first spatial relation of the set of available spatial relations to be used for the SRS. In other cases, the MAC-CE component 1025 may transmit, to the UE, a MAC-CE that indicates a SRS is to be transmitted by the UE and spatial relation information for the transmission of the SRS, where the spatial relation information indicates one or more uplink transmission parameters for transmission of the SRS via the one or more transmission beams.

The SRS reception manager 1030 may receive the SRS from the UE based on the one or more uplink transmission parameters indicated in the first spatial relation, or the one or more uplink transmission parameters indicated in the MAC-CE.

The connection establishment manager 1035 may establish a connection with a UE via one or more transmission beams.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
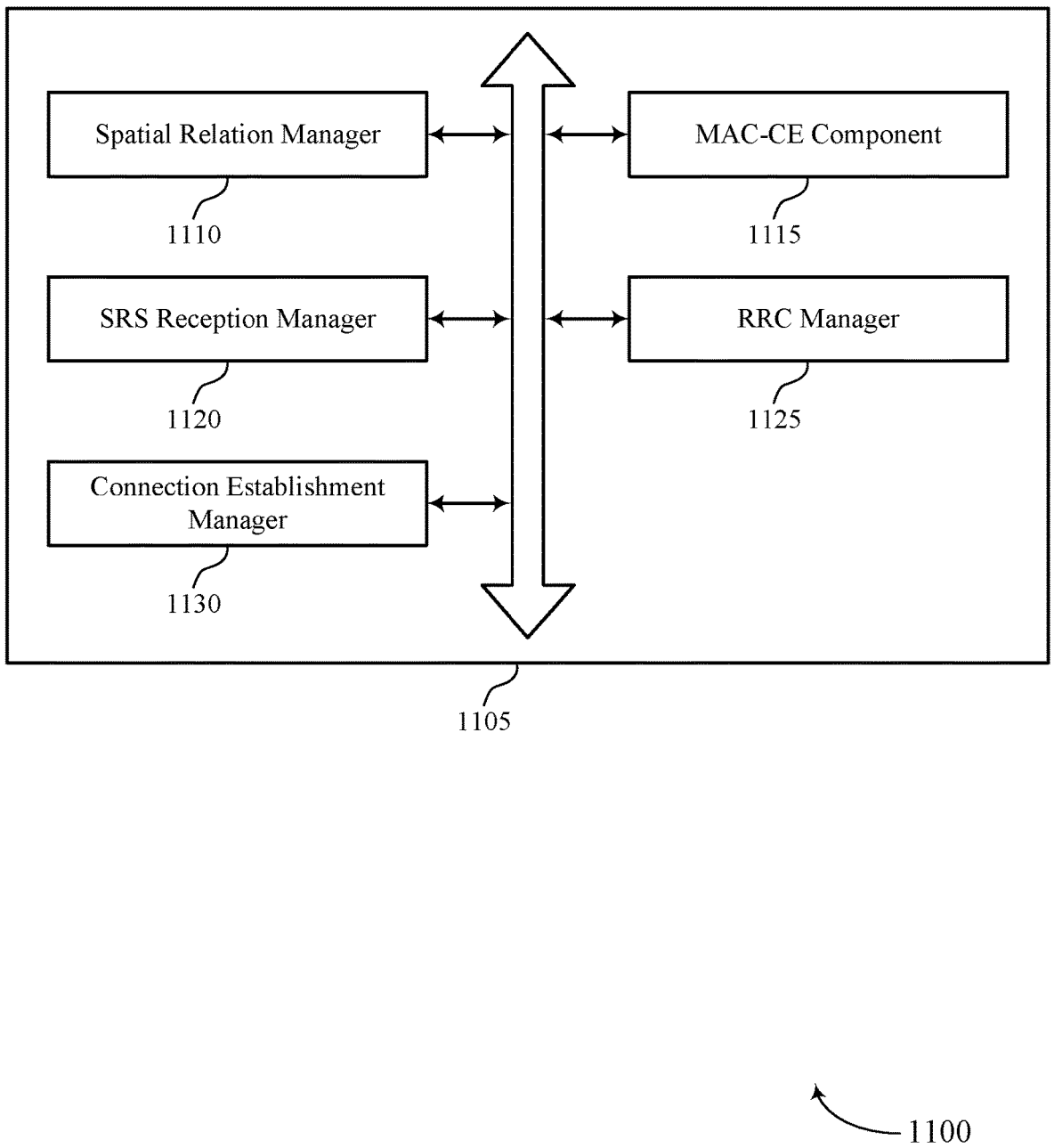
FIG. 11 shows a block diagram of a communications manager that supports uplink reference signal spatial relation identification techniques in accordance with aspects of the present disclosure.

FIG. 11 shows a block diagram 1100 of a base station communications manager 1105 that supports uplink reference signal spatial relation identification techniques in accordance with aspects of the present disclosure. The base station communications manager 1105 may be an example of aspects of a base station communications manager 915, a base station communications manager 1015, or a base station communications manager 1210 described herein. The base station communications manager 1105 may include a spatial relation manager 1110, a MAC-CE component 1115, a SRS reception manager 1120, a RRC manager 1125, and a connection establishment manager 1130. Each of these modules may communicate, directly or indirectly, with one another (e.g., via one or more buses).

The spatial relation manager 1110 may configure a UE with a set of available spatial relations for transmitting a SRS to the base station, each spatial relation of the set of available spatial relations indicating one or more uplink transmission parameters for transmission of the SRS.

In some examples, the spatial relation manager 1110 may transmit, to the UE, spatial relation information for PUCCH communications that indicates the set of available spatial relations for transmitting the PUCCH, each available spatial relation of the set of available spatial relations having a corresponding PUCCH spatial relation information identification.

In some examples, the spatial relation manager 1110 may transmit, to the UE, spatial relation information that indicates the set of available spatial relations for SRS transmissions, each available spatial relation of the set of available spatial relations having a corresponding SRS spatial relation information identification. In some cases, the set of available spatial relations is determined for each bandwidth part or component carrier that is available for transmission of a SRS. In some cases, the set of available spatial relations is determined for one or more SRS resources that are available for SRS transmissions. In some cases, each spatial relation of the set of available spatial relations indicates one or more of a serving cell index, a SRS bandwidth part index, a synchronization signal block index, a channel state information reference signal resource index, a SRS resource index, or any combinations thereof. In some cases, the spatial relation information in the MAC-CE identifies a SRS transmission beam for the transmission of the SRS.

In some cases, the spatial relation information in the MAC-CE indicates one or more of a serving cell index, a SRS bandwidth part index, a synchronization signal block index, a channel state information reference signal resource index, a SRS resource index, or any combinations thereof.

The MAC-CE component 1115 may transmit, to the UE, a MAC-CE that indicates the SRS is to be transmitted by the UE and a first spatial relation of the set of available spatial relations to be used for the SRS. In some cases, the MAC-CE indicates a PUCCH spatial relation information identification associated with the first spatial relation is to be used for the SRS.

In some examples, the MAC-CE component 1115 may transmit, to the UE, a MAC-CE that indicates a SRS is to be transmitted by the UE and spatial relation information for the transmission of the SRS, where the spatial relation information indicates one or more uplink transmission parameters for transmission of the SRS via the one or more transmission beams. In some cases, the MAC-CE indicates a SRS spatial relation information identification associated with the first spatial relation is to be used for the SRS. In some cases, the spatial relation information in the MAC-CE is provided for each of one or more SRS resources.

The SRS reception manager 1120 may receive the SRS from the UE based on the one or more uplink transmission parameters indicated in the first spatial relation. In some examples, the SRS reception manager 1120 may receive the SRS from the UE based on the one or more uplink transmission parameters indicated in the medium-access-control control element. In some cases, the SRS includes an aperiodic, periodic, and semi-persistent SRS. In some cases, the SRS is transmitted for one or more of a beam management procedure, codebook or non-codebook precoding procedure, antenna switching procedure, or any combinations thereof.

The connection establishment manager 1130 may establish a connection with a UE via one or more transmission beams.

The RRC manager 1125 may manage RRC signaling between the base station and a UE. In some cases, the spatial relation information for physical uplink control channel communications is transmitted in radio resource control signaling. In some cases, the spatial relation information for SRS transmissions is transmitted in radio resource control signaling.

Figure 12:
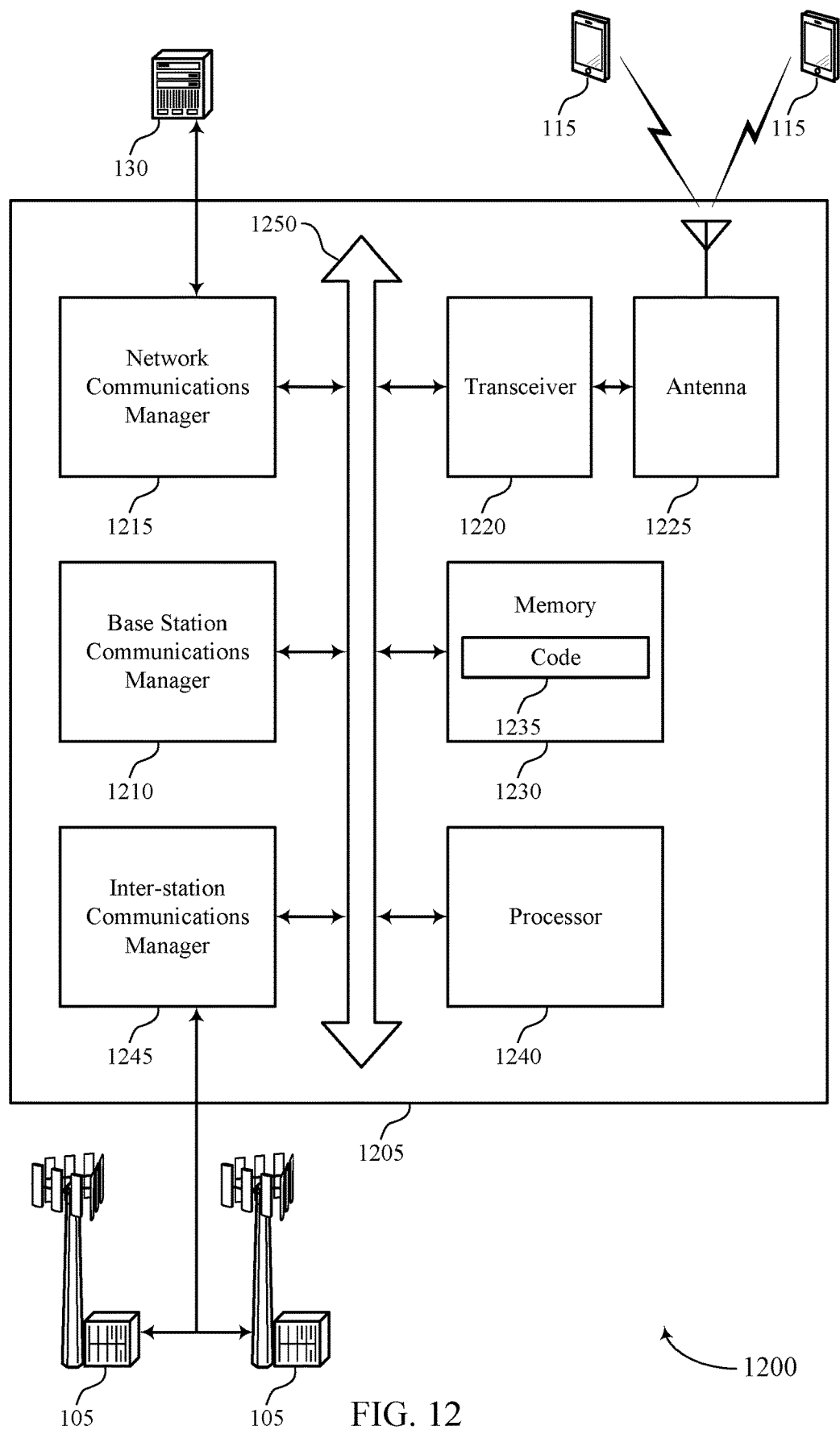
FIG. 12 shows a diagram of a system including a device that supports uplink reference signal spatial relation identification techniques in accordance with aspects of the present disclosure.

FIG. 12 shows a diagram of a system 1200 including a device 1205 that supports uplink reference signal spatial relation identification techniques in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may configure a UE with a set of available spatial relations for transmitting a SRS to the base station, each spatial relation of the set of available spatial relations indicating one or more uplink transmission parameters for transmission of the SRS, transmit, to the UE, a MAC-CE that indicates the SRS is to be transmitted by the UE and a first spatial relation of the set of available spatial relations to be used for the SRS, and receive the SRS from the UE based on the one or more uplink transmission parameters indicated in the first spatial relation.

The base station communications manager 1210 may also establish a connection with a UE via one or more transmission beams, transmit, to the UE, a MAC-CE that indicates a SRS is to be transmitted by the UE and spatial relation information for the transmission of the SRS, where the spatial relation information indicates one or more uplink transmission parameters for transmission of the SRS via the one or more transmission beams, and receive the SRS from the UE based on the one or more uplink transmission parameters indicated in the medium-access-control control element.

The network base station communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink reference signal spatial relation identification techniques).

Through reduced computational complexity, a processor 1240 of base station 105 may save power and increase battery life through efficient beam management. Another implementation may provide improved quality and reliability of service at the base station 105, as a number of computations or computational complexity is reduced through faster and more efficient beam refinement.

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
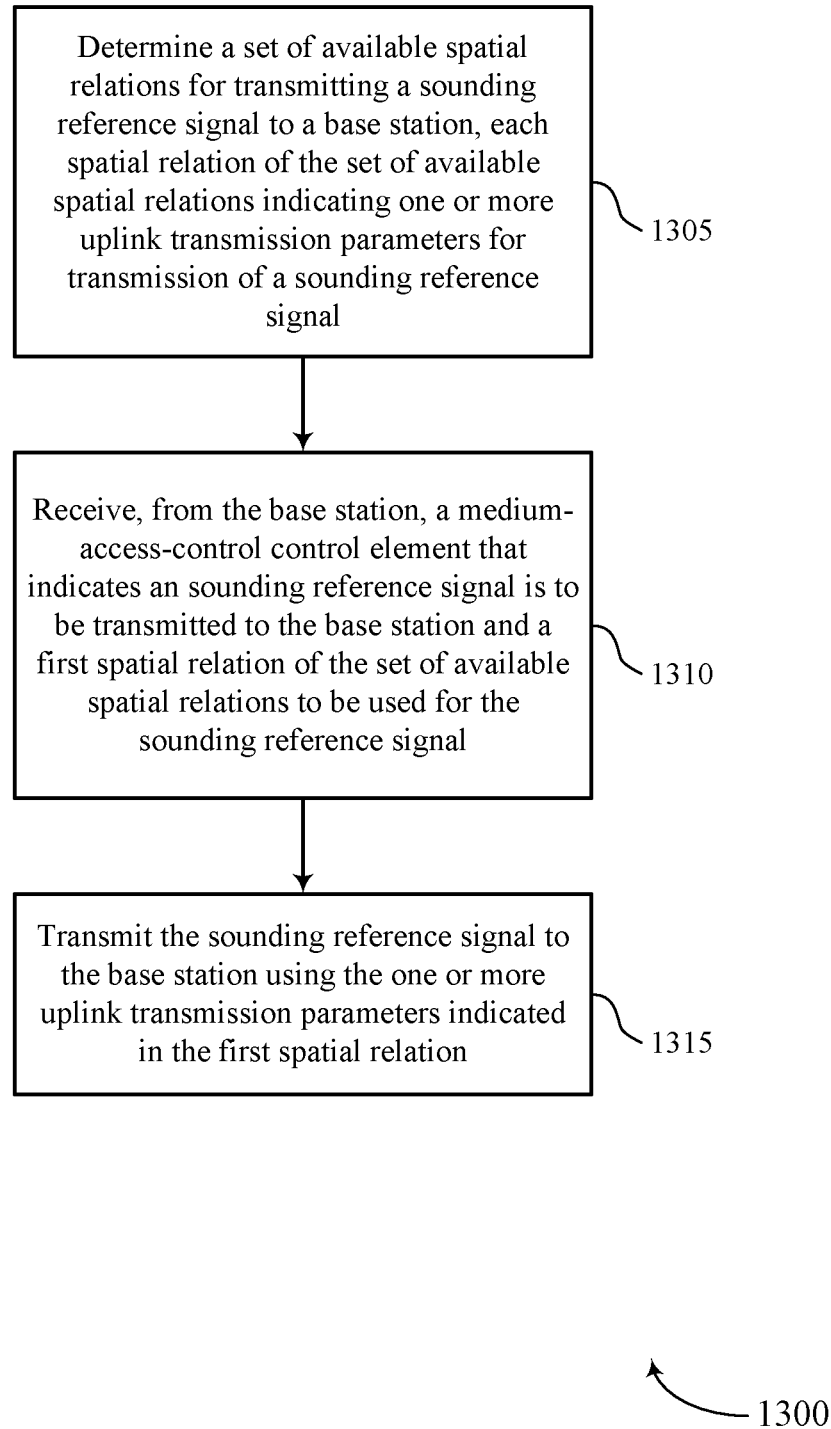
FIGS. 13 through 16 show flowcharts illustrating methods that support uplink reference signal spatial relation identification techniques in accordance with aspects of the present disclosure.

FIG. 13 shows a flowchart illustrating a method 1300 that supports uplink reference signal spatial relation identification techniques in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine a set of available spatial relations for transmitting a SRS to a base station, each spatial relation of the set of available spatial relations indicating one or more uplink transmission parameters for transmission of a SRS. The operations of 1305 may be performed according to the methods described herein. In some examples, aspects of the operations of 1305 may be performed by a spatial relation manager as described with reference to FIGS. 5 through 8.

At 1310, the UE may receive, from the base station, a MAC-CE that indicates an SRS is to be transmitted to the base station and a first spatial relation of the set of available spatial relations to be used for the SRS. The operations of 1310 may be performed according to the methods described herein. In some examples, aspects of the operations of 1310 may be performed by a MAC-CE component as described with reference to FIGS. 5 through 8.

At 1315, the UE may transmit the SRS to the base station using the one or more uplink transmission parameters indicated in the first spatial relation. The operations of 1315 may be performed according to the methods described herein. In some examples, aspects of the operations of 1315 may be performed by a SRS transmission manager as described with reference to FIGS. 5 through 8.

Figure 14:
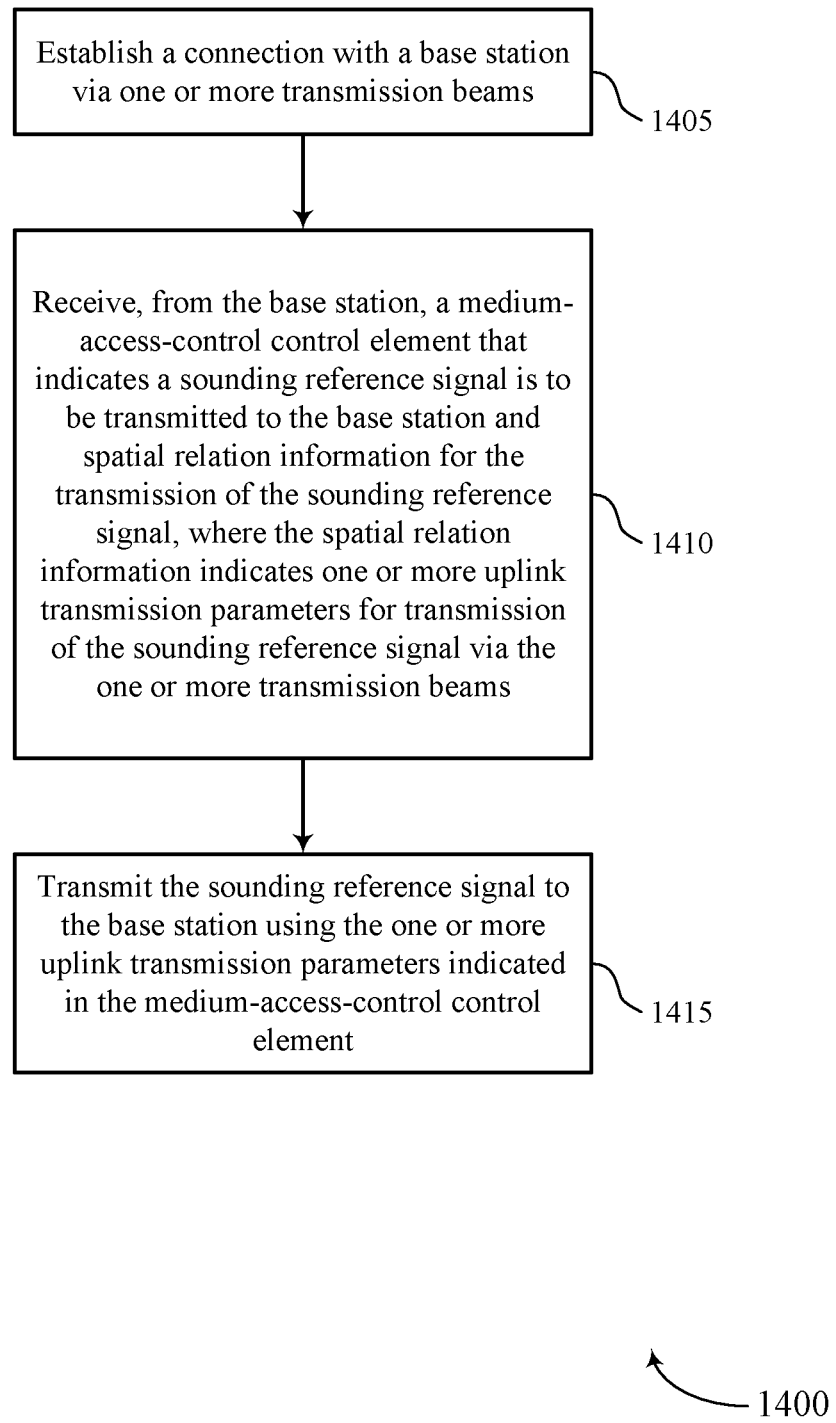

FIG. 14 shows a flowchart illustrating a method 1400 that supports uplink reference signal spatial relation identification techniques in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may establish a connection with a base station via one or more transmission beams. The operations of 1405 may be performed according to the methods described herein. In some examples, aspects of the operations of 1405 may be performed by a connection establishment manager as described with reference to FIGS. 5 through 8.

At 1410, the UE may receive, from the base station, a MAC-CE that indicates a SRS is to be transmitted to the base station and spatial relation information for the transmission of the SRS, where the spatial relation information indicates one or more uplink transmission parameters for transmission of the SRS via the one or more transmission beams. The operations of 1410 may be performed according to the methods described herein. In some examples, aspects of the operations of 1410 may be performed by a MAC-CE component as described with reference to FIGS. 5 through 8.

At 1415, the UE may transmit the SRS to the base station using the one or more uplink transmission parameters indicated in the medium-access-control control element. The operations of 1415 may be performed according to the methods described herein. In some examples, aspects of the operations of 1415 may be performed by a SRS transmission manager as described with reference to FIGS. 5 through 8.

Figure 15:
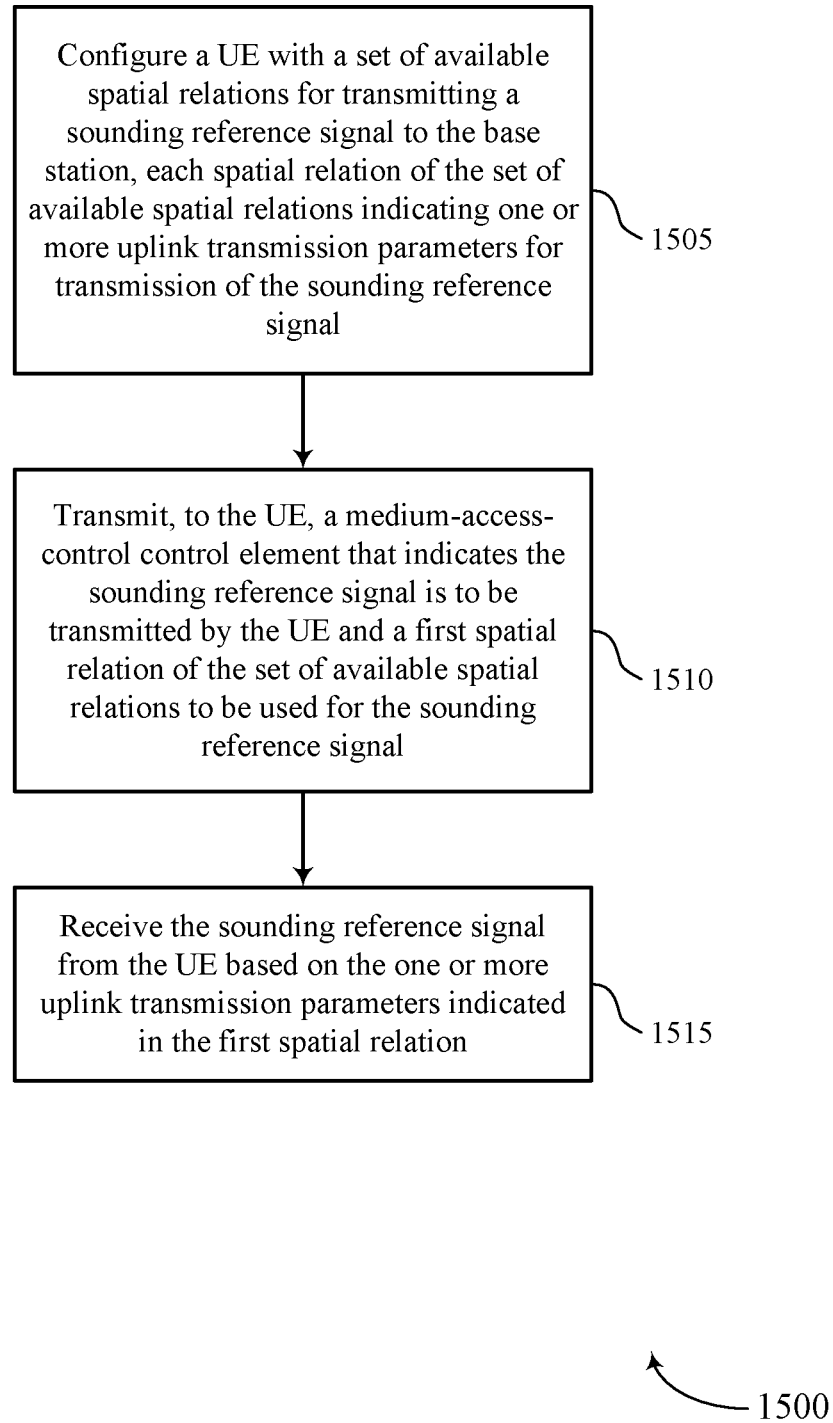

FIG. 15 shows a flowchart illustrating a method 1500 that supports uplink reference signal spatial relation identification techniques in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may configure a UE with a set of available spatial relations for transmitting a SRS to the base station, each spatial relation of the set of available spatial relations indicating one or more uplink transmission parameters for transmission of the SRS. The operations of 1505 may be performed according to the methods described herein. In some examples, aspects of the operations of 1505 may be performed by a spatial relation manager as described with reference to FIGS. 9 through 12.

At 1510, the base station may transmit, to the UE, a MAC-CE that indicates the SRS is to be transmitted by the UE and a first spatial relation of the set of available spatial relations to be used for the SRS. The operations of 1510 may be performed according to the methods described herein. In some examples, aspects of the operations of 1510 may be performed by a MAC-CE component as described with reference to FIGS. 9 through 12.

At 1515, the base station may receive the SRS from the UE based on the one or more uplink transmission parameters indicated in the first spatial relation. The operations of 1515 may be performed according to the methods described herein. In some examples, aspects of the operations of 1515 may be performed by a SRS reception manager as described with reference to FIGS. 9 through 12.

Figure 16:
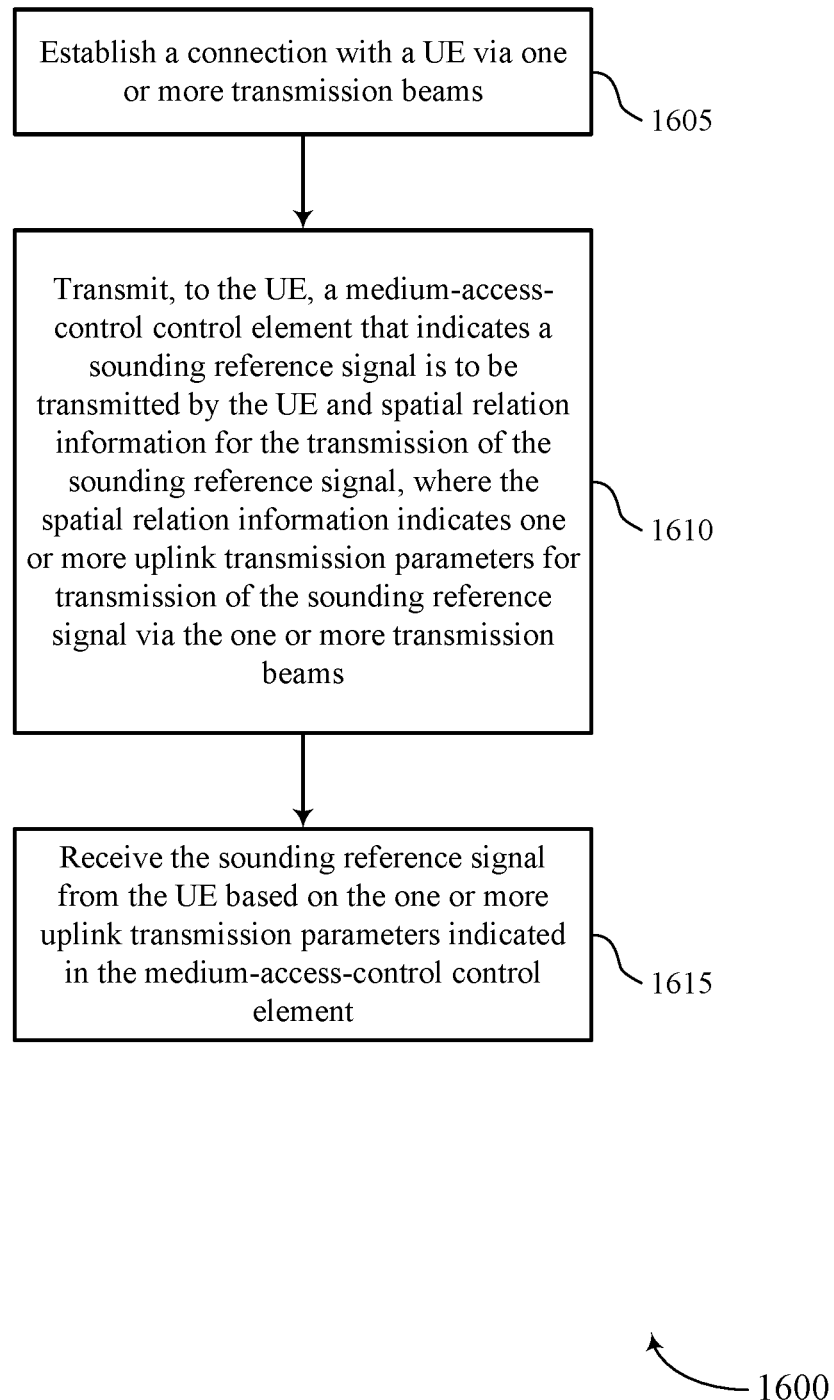

FIG. 16 shows a flowchart illustrating a method 1600 that supports uplink reference signal spatial relation identification techniques in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may establish a connection with a UE via one or more transmission beams. The operations of 1605 may be performed according to the methods described herein. In some examples, aspects of the operations of 1605 may be performed by a connection establishment manager as described with reference to FIGS. 9 through 12.

At 1610, the base station may transmit, to the UE, a MAC-CE that indicates a SRS is to be transmitted by the UE and spatial relation information for the transmission of the SRS, where the spatial relation information indicates one or more uplink transmission parameters for transmission of the SRS via the one or more transmission beams. The operations of 1610 may be performed according to the methods described herein. In some examples, aspects of the operations of 1610 may be performed by a MAC-CE component as described with reference to FIGS. 9 through 12.

At 1615, the base station may receive the SRS from the UE based on the one or more uplink transmission parameters indicated in the medium-access-control control element. The operations of 1615 may be performed according to the methods described herein. In some examples, aspects of the operations of 1615 may be performed by a SRS reception manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Example 1: A method for wireless communication at a user equipment (UE), comprising: determining a set of available spatial relations for transmitting a sounding reference signal to a base station, each spatial relation of the set of available spatial relations indicating one or more uplink transmission parameters for transmission of a sounding reference signal; receiving, from the base station, a medium-access-control control element that indicates a sounding reference signal is to be transmitted to the base station and a first spatial relation of the set of available spatial relations to be used for the sounding reference signal; and transmitting the sounding reference signal to the base station using the one or more uplink transmission parameters indicated in the first spatial relation.

Example 2: The method of example 1, wherein the sounding reference signal includes an aperiodic, periodic, and semi-persistent sounding reference signal.

Example 3: The method of example 1, wherein the sounding reference signal is transmitted for one or more of a beam management procedure, codebook or non-codebook precoding procedure, antenna switching procedure, or any combinations thereof.

Example 4: The method of example 1, wherein the determining the set of available spatial relations comprises: receiving spatial relation information for physical uplink control channel communications that indicates the set of available spatial relations for transmitting the physical uplink control channel, each available spatial relation of the set of available spatial relations having a corresponding physical uplink control channel spatial relation information identification.

Example 5: The method of example 4, wherein the medium-access-control control element indicates a physical uplink control channel spatial relation information identification associated with the first spatial relation is to be used for the sounding reference signal.

Example 6: The method of example 4, wherein the spatial relation information for the physical uplink control channel is received in radio resource control signaling.

Example 7: The method of example 1, wherein the determining the set of available spatial relations comprises: receiving spatial relation information that indicates the set of available spatial relations for sounding reference signal transmissions, each available spatial relation of the set of available spatial relations having a corresponding sounding reference signal spatial relation information identification.

Example 8: The method of example 7, wherein the medium-access-control control element indicates a sounding reference signal spatial relation information identification associated with the first spatial relation is to be used for the sounding reference signal.

Example 9: The method of example 7, wherein the spatial relation information for sounding reference signal transmissions is received in radio resource control signaling.

Example 10: The method of example 1, wherein the set of available spatial relations is determined for each bandwidth part or component carrier that is available for transmission of a sounding reference signal.

Example 11: The method of example 1, wherein the set of available spatial relations is determined for one or more sounding reference signal resources that are available for sounding reference signal transmissions.

Example 12: The method of example 1, wherein each spatial relation of the set of available spatial relations indicates a serving cell index, a sounding reference signal bandwidth part index, a synchronization signal block index, a channel state information reference signal resource index, a sounding reference signal resource index, or any combinations thereof.

Example 13: An apparatus for wireless communications comprising a processor; and memory coupled to the processor, the processor and memory configured to: perform a method of any of examples 1 to 12.

Example 14: A non-transitory computer-readable medium storing code for wireless communications, the code comprising instructions executable by a processor to perform a method of any of examples 1 to 12.

Example 15: An apparatus, comprising means for performing the method of any of examples 1 to 12.

Example 16: A method for wireless communication at a user equipment (UE), comprising: establishing a connection with a base station via one or more transmission beams; receiving, from the base station, a medium-access-control control element that indicates a sounding reference signal is to be transmitted to the base station and spatial relation information for the transmission of the sounding reference signal, wherein the spatial relation information indicates one or more uplink transmission parameters for transmission of the sounding reference signal via the one or more transmission beams; and transmitting the sounding reference signal to the base station using the one or more uplink transmission parameters indicated in the medium-access-control control element.

Example 17: The method of example 16, wherein the sounding reference signal includes an aperiodic, periodic, and semi-persistent sounding reference signal.

Example 18: The method of example 16, wherein the sounding reference signal is transmitted for one or more of a beam management procedure, codebook or non-codebook precoding procedure, antenna switching procedure, or any combinations thereof.

Example 19: The method of example 16, wherein the spatial relation information in the medium-access-control control element is provided for each of one or more sounding reference signal resources.

Example 20: The method of example 16, wherein the spatial relation information in the medium-access-control control element identifies a location of the sounding reference signal in a time-frequency resource grid.

Example 21: The method of example 16, wherein the spatial relation information in the medium-access-control control element indicates one or more of a serving cell index, a sounding reference signal bandwidth part index, a synchronization signal block index, a channel state information reference signal resource index, a sounding reference signal resource index, or any combinations thereof.

Example 22: An apparatus for wireless communications comprising a processor; and memory coupled to the processor, the processor and memory configured to: perform a method of any of examples 16 to 21.

Example 23: A non-transitory computer-readable medium storing code for wireless communications, the code comprising instructions executable by a processor to perform a method of any of examples 16 to 21.

Example 24: An apparatus, comprising means for performing the method of any of examples 16 to 21.

Example 25: A method for wireless communication at a base station, comprising: configuring a user equipment (UE) with a set of available spatial relations for transmitting a sounding reference signal to the base station, each spatial relation of the set of available spatial relations indicating one or more uplink transmission parameters for transmission of the sounding reference signal; transmitting, to the UE, a medium-access-control control element that indicates the sounding reference signal is to be transmitted by the UE and a first spatial relation of the set of available spatial relations to be used for the sounding reference signal; and receiving the sounding reference signal from the UE based at least in part on the one or more uplink transmission parameters indicated in the first spatial relation.

Example 26: The method of example 25, wherein the sounding reference signal includes an aperiodic, periodic, and semi-persistent sounding reference signal.

Example 27: The method of example 25, wherein the sounding reference signal is transmitted for one or more of a beam management procedure, codebook or non-codebook precoding procedure, antenna switching procedure, or any combinations thereof.

Example 28: The method of example 25, wherein the configuring the UE comprises: transmitting, to the UE, spatial relation information for physical uplink control channel communications that indicates the set of available spatial relations for transmitting the physical uplink control channel, each available spatial relation of the set of available spatial relations having a corresponding physical uplink control channel spatial relation information identification.

Example 29: The method of example 28, wherein the medium-access-control control element indicates a physical uplink control channel spatial relation information identification associated with the first spatial relation is to be used for the sounding reference signal.

Example 30: The method of example 28, wherein the spatial relation information for physical uplink control channel communications is transmitted in radio resource control signaling.

Example 31: The method of example 25, wherein the configuring the UE comprises: transmitting, to the UE, spatial relation information that indicates the set of available spatial relations for sounding reference signal transmissions, each available spatial relation of the set of available spatial relations having a corresponding sounding reference signal spatial relation information identification.

Example 32: The method of example 31, wherein the medium-access-control control element indicates a sounding reference signal spatial relation information identification associated with the first spatial relation is to be used for the sounding reference signal.

Example 33: The method of example 31, wherein the spatial relation information for sounding reference signal transmissions is transmitted in radio resource control signaling.

Example 34: The method of example 25, wherein the set of available spatial relations is determined for each bandwidth part or component carrier that is available for transmission of a sounding reference signal.

Example 35: The method of example 25, wherein the set of available spatial relations is determined for one or more sounding reference signal resources that are available for sounding reference signal transmissions.

Example 36: The method of example 25, wherein each spatial relation of the set of available spatial relations indicates one or more of a serving cell index, a sounding reference signal bandwidth part index, a synchronization signal block index, a channel state information reference signal resource index, a sounding reference signal resource index, or any combinations thereof.

Example 37: An apparatus for wireless communications comprising a processor; and memory coupled to the processor, the processor and memory configured to: perform a method of any of examples 25 to 36.

Example 38: A non-transitory computer-readable medium storing code for wireless communications, the code comprising instructions executable by a processor to perform a method of any of examples 25 to 36.

Example 39: An apparatus, comprising means for performing the method of any of examples 25 to 36.

Example 40: A method for wireless communication at a base station, comprising: establishing a connection with a user equipment (UE) via one or more transmission beams; transmitting, to the UE, a medium-access-control control element that indicates a sounding reference signal is to be transmitted by the UE and spatial relation information for the transmission of the sounding reference signal, wherein the spatial relation information indicates one or more uplink transmission parameters for transmission of the sounding reference signal via the one or more transmission beams; and receiving the sounding reference signal from the UE based at least in part on the one or more uplink transmission parameters indicated in the medium-access-control control element.

Example 41: The method of example 40, wherein the sounding reference signal includes an aperiodic, periodic, and semi-persistent sounding reference signal.

Example 42: The method of example 40, wherein the sounding reference signal is transmitted for one or more of a beam management procedure, codebook or non-codebook precoding procedure, antenna switching procedure, or any combinations thereof.

Example 43: The method of example 40, wherein the spatial relation information in the medium-access-control control element is provided for each of one or more sounding reference signal resources.

Example 44: The method of example 40, wherein the spatial relation information in the medium-access-control control element identifies a sounding reference signal transmission beam for the transmission of the sounding reference signal.

Example 45: The method of example 40, wherein the spatial relation information in the MAC-CE indicates one or more of a serving cell index, a sounding reference signal bandwidth part index, a synchronization signal block index, a channel state information reference signal resource index, a sounding reference signal resource index, or any combinations thereof.

Example 46: An apparatus for wireless communications comprising a processor; and memory coupled to the processor, the processor and memory configured to: perform a method of any of examples 40 to 45.

Example 47: A non-transitory computer-readable medium storing code for wireless communications, the code comprising instructions executable by a processor to perform a method of any of examples 40 to 45.

Example 48: An apparatus, comprising means for performing the method of any of examples 40 to 45.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in at least one of the one or more memories and executable by the one or more processors, individually or collectively, to cause the apparatus to:
   receive, from a network entity, radio resource control signaling that configures one or more sounding reference signal resources for transmitting a sounding reference signal to the network entity;

receive, from the network entity, a medium-access-control control element that indicates a set of one or more available spatial relations for transmitting the sounding reference signal to the network entity, the medium-access-control control element indicating a first sounding reference signal resource of the one or more sounding reference signal resources and a first spatial relation of the set of one or more available spatial relations to be used for the sounding reference signal, the first spatial relation indicating at least one of a synchronization signal block index, a channel state information reference signal resource index, or a sounding reference signal resource index; and transmit the sounding reference signal to the network entity using one or more uplink transmission parameters indicated in the first spatial relation.

2. The apparatus of claim 1, wherein the sounding reference signal is an aperiodic sounding reference signal.

3. The apparatus of claim 1, wherein the sounding reference signal is transmitted for one or more of a beam management procedure, codebook or non-codebook precoding procedure, antenna switching procedure, or any combinations thereof.

4. The apparatus of claim 1, wherein the instructions to receive the radio resource control signaling are executable by the one or more processors, individually or collectively, to cause the apparatus to:

receive spatial relation information that indicates the set of one or more available spatial relations for sounding reference signal transmissions, each available spatial relation of the set of one or more available spatial relations having a corresponding sounding reference signal spatial relation information identification.

5. The apparatus of claim 4, wherein the medium-access-control control element indicates a sounding reference signal spatial relation information identification associated with the first spatial relation is to be used for the sounding reference signal.

6. The apparatus of claim 4, wherein the spatial relation information for sounding reference signal transmissions is received in radio resource control signaling.

7. The apparatus of claim 1, wherein the set of one or more available spatial relations is determined for each bandwidth part or component carrier that is available for transmission of a sounding reference signal.

8. The apparatus of claim 1, wherein the set of one or more available spatial relations is determined for one or more sounding reference signal resources that are available for sounding reference signal transmissions.

9. The apparatus of claim 1, wherein the first spatial relation further indicates a serving cell index, a sounding reference signal bandwidth part index, or both.

10. An apparatus for wireless communication at a user equipment (UE), comprising:

one or more processors;

one or more memories coupled with the one or more processors; and instructions stored in at least one of the one or more memories and executable by the one or more processors, individually or collectively, to cause the apparatus to:

receive, from a network entity, radio resource control signaling that configures a set of available spatial relations, wherein each spatial relation of the set of available spatial relations indicates at least one of a synchronization signal block index, a channel state information reference signal resource index, or a sounding reference signal resource index;

receive, from the network entity, a medium-access-control control element that indicates updated spatial relation information corresponding to the set of available spatial relations for transmission of a sounding reference signal, wherein the updated spatial relation information indicates an update to at least one of the synchronization signal block index, the channel state information reference signal resource index, or the sounding reference signal resource index; and transmit the sounding reference signal to the network entity using the updated spatial relation information indicated in the medium-access-control control element.

11. The apparatus of claim 10, wherein the sounding reference signal is an aperiodic sounding reference signal.

12. The apparatus of claim 10, wherein the sounding reference signal is transmitted for one or more of a beam management procedure, codebook or non-codebook precoding procedure, antenna switching procedure, or any combinations thereof.

13. The apparatus of claim 10, wherein the updated spatial relation information in the medium-access-control control element is provided for each of one or more sounding reference signal resources.

14. The apparatus of claim 10, wherein the updated spatial relation information in the medium-access-control control element identifies a location of the sounding reference signal in a time-frequency resource grid.

15. The apparatus of claim 10, wherein the updated spatial relation information in the medium-access-control control element further indicates a serving cell index, a sounding reference signal bandwidth part index, or both.

16. An apparatus for wireless communication at a network entity, comprising:

one or more processors;

one or more memories coupled with the one or more processors; and instructions stored in at least one of the one or more memories and executable by the one or more processors, individually or collectively, to cause the apparatus to:

transmit, to a user equipment (UE), radio resource control signaling that configures one or more sounding reference signal resources for transmitting a sounding reference signal to the network entity;

transmit, to the UE, a medium-access-control control element that indicates a set of one or more available spatial relations for transmitting the sounding reference signal to the network entity, the medium-access-control control element indicating a first sounding reference signal resource of the one or more sounding reference signal resources and a first spatial relation of the set of one or more available spatial relations to be used for the sounding reference signal, the first spatial relation indicating at least one of a synchronization signal block index, a channel state information reference signal resource index, or a sounding reference signal resource index; and receive the sounding reference signal from the UE based at least in part on one or more uplink transmission parameters indicated in the first spatial relation.

17. The apparatus of claim 16, wherein the sounding reference signal is an aperiodic sounding reference signal.

18. The apparatus of claim 16, wherein the sounding reference signal is transmitted for one or more of a beam management procedure, codebook or non-codebook precoding procedure, antenna switching procedure, or any combinations thereof.

19. The apparatus of claim 16, wherein the instructions to transmit the radio resource control signaling are executable by the one or more processors, individually or collectively, to cause the apparatus to:
transmit, to the UE, spatial relation information that indicates the set of one or more available spatial relations for sounding reference signal transmissions, each available spatial relation of the set of one or more available spatial relations having a corresponding sounding reference signal spatial relation information identification.

20. The apparatus of claim 19, wherein the medium-access-control control element indicates a sounding reference signal spatial relation information identification associated with the first spatial relation is to be used for the sounding reference signal.

21. The apparatus of claim 19, wherein the spatial relation information for sounding reference signal transmissions is transmitted in radio resource control signaling.

22. The apparatus of claim 16, wherein the set of one or more available spatial relations is determined for each bandwidth part or component carrier that is available for transmission of a sounding reference signal.

23. The apparatus of claim 16, wherein the set of one or more available spatial relations is determined for one or more sounding reference signal resources that are available for sounding reference signal transmissions.

24. The apparatus of claim 16, wherein each spatial relation of the set of one or more available spatial relations indicates one or more of a serving cell index, a sounding reference signal bandwidth part index, a synchronization signal block index, a channel state information reference signal resource index, a sounding reference signal resource index, or any combinations thereof.

25. An apparatus for wireless communication at a network entity, comprising:
one or more processors;
one or more memories coupled with the one or more processors; and
instructions stored in at least one of the one or more memories and executable by the one or more processors, individually or collectively, to cause the apparatus to:
transmit, to user equipment (UE), radio resource control signaling that configures a set of available spatial relations, wherein each spatial relation of the set of available spatial relations indicates at least one of a synchronization signal block index, a channel state information reference signal resource index, or a sounding reference signal resource index;
transmit, to the UE, a medium-access-control control element that indicates a sounding reference signal is to be transmitted by the UE and updated spatial relation information corresponding to the set of available spatial relations for transmission of the sounding reference signal, wherein the updated spatial relation information indicates an update to at least one of the synchronization signal block index, the channel state information reference signal resource index, or the sounding reference signal resource index; and
receive the sounding reference signal from the UE based at least in part on the updated spatial relation information indicated in the medium-access-control control element.

26. The apparatus of claim 25, wherein the sounding reference signal is an aperiodic sounding reference signal.

27. The apparatus of claim 25, wherein the sounding reference signal is transmitted for one or more of a beam management procedure, codebook or non-codebook precoding procedure, antenna switching procedure, or any combinations thereof.

28. The apparatus of claim 25, wherein the updated spatial relation information in the medium-access-control control element is provided for each of one or more sounding reference signal resources.

29. The apparatus of claim 25, wherein the updated spatial relation information in the medium-access-control control element identifies a sounding reference signal transmission beam for the transmission of the sounding reference signal.

30. The apparatus of claim 25, wherein the updated spatial relation information in the medium-access-control control element indicates one or more of a serving cell index, a sounding reference signal bandwidth part index, a synchronization signal block index, a channel state information reference signal resource index, a sounding reference signal resource index, or any combinations thereof.

* * * * *